United States Patent
Hirano et al.

(10) Patent No.: US 6,661,958 B2
(45) Date of Patent: Dec. 9, 2003

(54) OPTICAL FIBER AND NONLINEAR OPTICAL FIBER, OPTICAL AMPLIFIER AND WAVELENGTH CONVERTER USING THE SAME, AND METHOD OF MAKING OPTICAL FIBER

(75) Inventors: Masaaki Hirano, Yokohama (JP); Masashi Onishi, Yokohama (JP); Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 56 days.

(21) Appl. No.: 09/986,864

(22) Filed: Nov. 13, 2001

(65) Prior Publication Data

US 2002/0057880 A1 May 16, 2002

(30) Foreign Application Priority Data

Nov. 13, 2000 (JP) .................................... P2000-345377

(51) Int. Cl.[7] .................................................. G02B 6/02
(52) U.S. Cl. ........................ 385/127; 385/123; 385/126
(58) Field of Search ................................ 385/122–128, 385/142, 144

(56) References Cited

U.S. PATENT DOCUMENTS

| 5,960,146 | A | 9/1999 | Okuno et al. ............... 385/122 |
| 5,999,548 | A | 12/1999 | Mori et al. ................... 372/22 |
| 6,301,419 | B1 * | 10/2001 | Tsukitani et al. ........... 385/123 |
| 6,307,984 | B1 | 10/2001 | Watanabe .................... 385/24 |
| 6,347,174 | B1 * | 2/2002 | Onishi et al. ............... 385/122 |

FOREIGN PATENT DOCUMENTS

WO WO99/10770 3/1999

OTHER PUBLICATIONS

IEEE Journal of Selected Topics in Quantum Electronics (1999) Optical Fiber Technolpgy (1998).

* cited by examiner

Primary Examiner—Phan T. H. Palmer
(74) Attorney, Agent, or Firm—McDermott, Will & Emery

(57) ABSTRACT

Employed as a structure of a highly nonlinear optical fiber (nonlinear optical fiber) is a double-cladding structure in which a first cladding region 20 and a second cladding region 30 are disposed on the outer periphery of a core region 10. Since the double-cladding structure is employed, the cutoff wavelength $\lambda_c$ can sufficiently be shortened even when, in order to increase the nonlinear coefficient $\gamma$, the concentration of $GeO_2$ added into the core is enhanced so as to raise the nonlinear refractive index, or the relative refractive index difference between the core and cladding is increased so as to reduce the effective area $A_{eff}$. This realizes an optical fiber or nonlinear optical fiber shortening its cutoff wavelength while having a sufficient nonlinearity, an optical amplifier and wavelength converter using the same, and a method of making an optical fiber.

24 Claims, 18 Drawing Sheets

Fig.2

| Heating temperature (°C) | Number of generated bubbles (pieces/10mm) |
|---|---|
| 1950 | 10 |
| 1900 | 8 |
| 1850 | 3 |
| 1800 | 0 |

Fig.3

| Baking temperature (°C) | Number of generated bubbles (pieces/10mm) |
|---|---|
| 1000 | 7 |
| 1100 | 5 |
| 1200 | 2 |
| 1300 | 0 |

Fig.4

| Pipe roughness (°C) | Number of generated bubbles (pieces/10mm) |
|---|---|
| 10 | 11 |
| 8 | 6 |
| 6 | 2 |
| 5 | 0 |

Fig.5

| Rod roughness (μm) | Number of generated bubbles (pieces/10mm) |
|---|---|
| 10 | 8 |
| 8 | 4 |
| 6 | 1 |
| 5 | 0 |

Fig.6

| $GeO_2$ concentration (mol%) | Number of generated bubbles (pieces/10mm) |
|---|---|
| 10 | 10 |
| 8 | 7 |
| 6 | 2 |
| 5 | 0 |

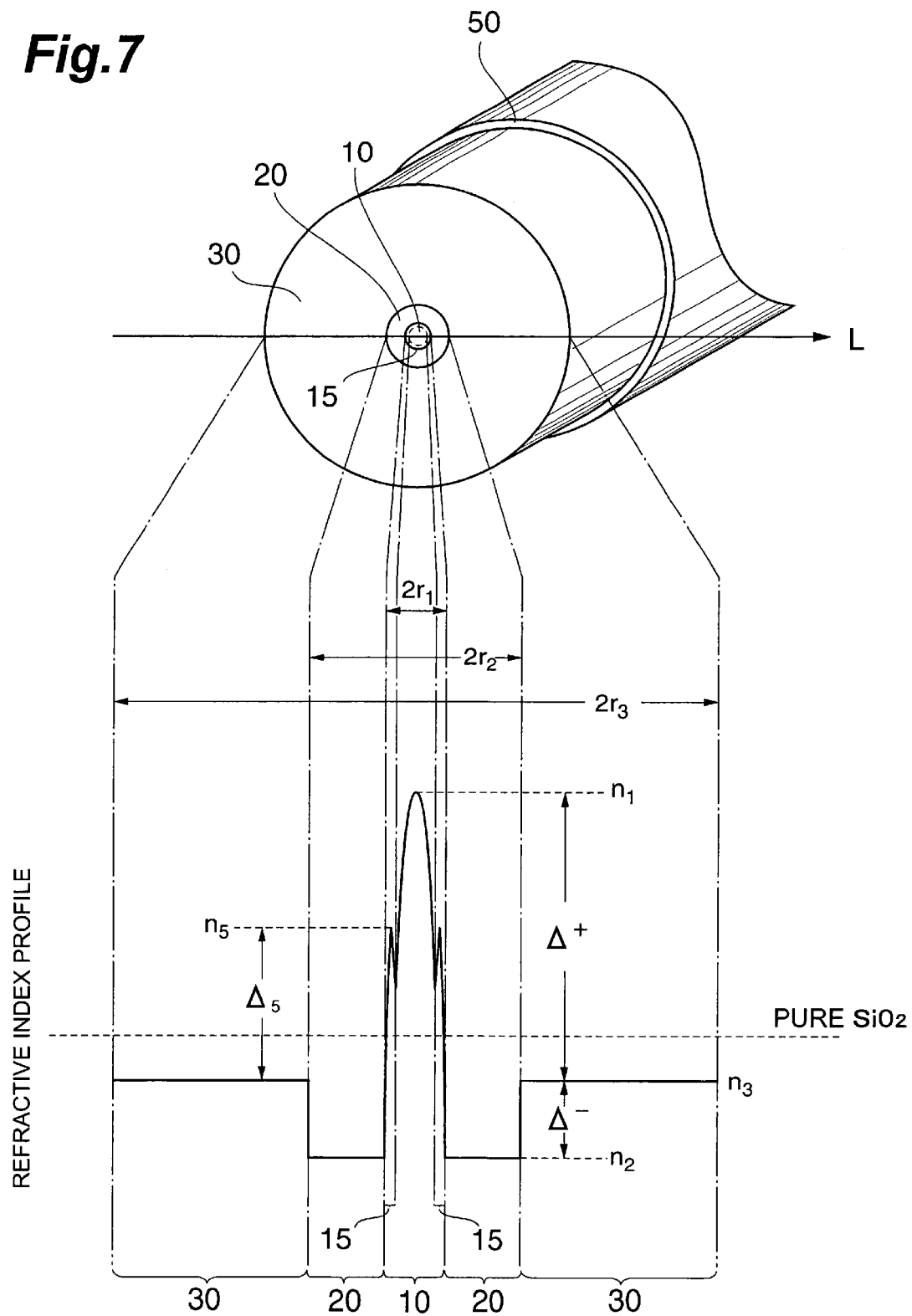

Fig.9

| Optical fiber<br>Characteristic | A1 | A2 |
|---|---|---|
| Transmission loss (dB/km) | 0.46 | 0.53 |
| Effective area ($\mu m^2$) | 10.4 | 10.5 |
| Nonlinear coefficient (/W/km) | 20.7 | 20.3 |
| Dispersion (ps/km/nm) | -0.34 | +0.31 |
| Dispersion slope (ps/km/nm²) | +0.045 | +0.042 |
| Zero-dispersion wavelength (nm) | 1557 | 1543 |
| Cutoff wavelength (nm) | 1514 | 1342 |
| Polarization mode dispersion (ps/√km) | 0.08 | 0.06 |

| Optical fiber<br>Characteristic | B1 | B2 | C1 | C2 |
|---|---|---|---|---|
| $\Delta^+$ (%) | 3.5 | 4.0 | 4.0 | 4.5 |
| $\Delta^-$ (%) | -0.4 | -0.4 | -0.7 | -0.7 |
| Zero-dispersion wavelength (nm) | 1526 | 1525 | 1524 | 1526 |
| Cutoff wavelength (nm) | 1443 | 1490 | 1441 | 1469 |
| Effective area ($\mu m^2$) | 8.16 | 7.34 | 7.08 | 6.55 |
| Nonlinear coefficient (/W/km) | 29.3 | 35.4 | 38.6 | 45.0 |

Fig.13

| Optical fiber Characteristic | D1 | D2 | D3 | D4 | D5 |
|---|---|---|---|---|---|
| $\Delta^+$ (%) | 2.5 | 2.6 | 2.7 | 3.0 | 3.5 |
| $\Delta^-$ (%) | — | — | — | — | — |
| Zero-dispersion wavelength (nm) | 1525 | 1524 | 1526 | 1525 | 1524 |
| Cutoff wavelength (nm) | 1471 | 1490 | 1505 | 1560 | 1602 |
| Effective area ($\mu m^2$) | 11.8 | 11.4 | 11.1 | 9.88 | 8.88 |
| Nonlinear coefficient (/W/km) | 16.7 | 17.7 | 18.5 | 22.4 | 26.8 |

Fig.14

| Optical fiber Characteristic | E1 | E2 | E3 | E4 | E5 | E6 | E7 | E8 |
|---|---|---|---|---|---|---|---|---|
| $\Delta^+$ (%) | 3.0 | 3.5 | 3.1 | 3.8 | 3.4 | 3.4 | 3.0 | 4.1 |
| $\Delta^-$ (%) | -0.50 | -0.50 | -0.70 | -0.40 | -0.40 | -0.40 | -0.40 | -0.49 |
| F concentration in 2nd cladding (mol%) | 0.6 | 0.6 | 0 | 1.1 | 1.1 | 1.1 | 1.1 | 0.70 |
| $2r_1$ ($\mu$m) | 4.9 | 4.4 | 2.3 | 2.8 | 4.3 | 4.7 | 4.8 | 4.0 |
| $2r_2$ ($\mu$m) | 16.3 | 14.5 | 7.5 | 8.1 | 12.3 | 13.5 | 13.7 | 13.2 |
| Transmission loss (dB/km) | 0.46 | 0.48 | 0.59 | 0.53 | 0.47 | 0.47 | 0.43 | 0.71 |
| Effective area ($\mu m^2$) | 10.9 | 9.2 | 8.8 | 7.3 | 9.3 | 10.0 | 10.8 | 7.9 |
| Nonlinear coefficient (/W/km) | 19.1 | 24.5 | 23.2 | 30.0 | 23.0 | 21.7 | 18.7 | 32.6 |
| Dispersion (ps/km/nm) | +3.3 | -3.3 | -103.2 | -63.3 | -5.5 | +0.18 | +1.09 | +0.03 |
| Dispersion slope (ps/km/nm$^2$) | +0.047 | +0.039 | -0.267 | -0.019 | +0.037 | +0.045 | +0.044 | +0.033 |
| Zero-dispersion wavelength (nm) | 1485 | — | — | — | — | 1551 | 1526 | 1556 |
| Cutoff wavelength (nm) | 1425 | 1394 | 770 | 959 | 1368 | 1510 | 1412 | 1530 |
| Polarization mode dispersion (ps/√km) | 0.08 | 0.08 | 0.06 | 0.10 | 0.03 | 0.05 | 0.05 | 0.11 |
| OH absorption transmission loss (dB/km) | 0.10 | 0.12 | 0.18 | 0.11 | 0.05 | 0.13 | 0.01 | 0.19 |

Fig.16

| Optical fiber Characteristic | F1 | F2 | F3 |
|---|---|---|---|
| $\Delta^+$ (%) | 3.1 | 3.0 | 4.1 |
| $\Delta^-$ (%) | -0.70 | -0.40 | -0.51 |
| F concentration in 2$^{nd}$ cladding (mol%) | 0 | 1.1 | 0.70 |
| $2r_1$ ($\mu$m) | 3.3 | 4.7 | 3.9 |
| $2r_2$ ($\mu$m) | 9.5 | 13.3 | 13.1 |
| Transmission loss (dB/km) | 0.76 | 0.70 | 1.8 |
| Effective area ($\mu$m$^2$) | 8.4 | 10.7 | 7.8 |
| Nonlinear coefficient (/W/km) | 25.2 | 18.7 | 32.8 |
| Dispersion (ps/km/nm) | -30.7 | -0.71 | -0.14 |
| Dispersion slope (ps/km/nm$^2$) | -0.01 | +0.042 | +0.032 |
| Zero-dispersion wavelength (nm) | — | 1565 | 1554 |
| Cutoff wavelength (nm) | 980 | 1371 | 1528 |
| Crosstalk (dB/km) | -21 | -18 | -26 |
| OH absorption transmission loss (dB/km) | 0.10 | 0.12 | 0.18 |

OPTICAL FIBER AND NONLINEAR OPTICAL FIBER, OPTICAL AMPLIFIER AND WAVELENGTH CONVERTER USING THE SAME, AND METHOD OF MAKING OPTICAL FIBER

BACKGROUND OF THE INVENTION

1. Field of the Invention

The present invention relates to an optical fiber and a nonlinear optical fiber, an optical amplifier and wavelength converter using the same, and a method of making an optical fiber.

2. Related Background Art

In general, it has been known that various nonlinear optical phenomena such as stimulated Raman effect and four-wave mixing occur in a medium when light having a high intensity (high optical density) propagates through the medium. These nonlinear optical phenomena also occur when light is transmitted through an optical fiber. Such nonlinear optical phenomena in the optical fiber can be used for optical amplification, wavelength conversion, and the like (see International Publication WO99/10770).

SUMMARY OF THE INVENTION

The nonlinearity of an optical fiber is represented by the nonlinear coefficient $\gamma$ in the following expression:

$$\gamma = (2\pi/\lambda) \times (N_2/A_{\mathit{eff}})$$

where $\lambda$ is the wavelength of light, $N_2$ is the nonlinear refractive index in the optical fiber at $\lambda$, and $A_{\mathit{eff}}$ is the effective area of the optical fiber at $\lambda$. This expression indicates that the nonlinear coefficient $\gamma$ can be made greater if the concentration of $GeO_2$ added into the core of the optical fiber is enhanced so as to raise the nonlinear refractive index $N_2$ while the relative refractive index difference between the core and cladding is increased so as to reduce the effective area $A_{\mathit{eff}}$.

When the configurational condition mentioned above is employed so as to increase the nonlinear coefficient $\gamma$, however, the cutoff wavelength $\lambda_c$ of the optical fiber may become longer. When the four-wave mixing occurring in the optical fiber is used for carrying out wavelength conversion, in particular, it is necessary that the wavelength of excitation light be located near the zero-dispersion wavelength of the optical fiber. In the above-mentioned configuration, by contrast, the cutoff wavelength $\lambda_c$ becomes longer than the zero-dispersion wavelength, so that no single mode can be attained, whereby the efficiency of wavelength conversion decreases.

In recent years, in order to widen the wavelength band of signal light used in optical transmission systems, the use of not only the amplification band of EDFA usually employed as an optical amplifier, but also S band in which wavelength ranges from 1.45 to 1.53 $\mu$m, which is located on the shorter wavelength side of the former band, has been under consideration. For the S band, the EDFA is very difficult to be used since its amplification band is outside thereof, whereby few effective amplifiers exist. If a Raman amplifier is to be used with a highly nonlinear optical fiber, the cutoff wavelength $\lambda_c$ becomes longer than the wavelength of excitation light, which is about 1.3 to 1.5 $\mu$m, whereby the efficiency in Raman amplification decreases.

For overcoming the foregoing problems, it is an object of the present invention to provide an optical fiber or nonlinear optical fiber exhibiting a shorter cutoff wavelength while having a sufficient nonlinearity, an optical amplifier and wavelength converter using the same, and a method of making an optical fiber.

For achieving such an object, the optical fiber in accordance with the present invention is characterized in that (1) it comprises, at least, a core region having a maximum refractive index value of $n_1$; a first cladding region, disposed at an outer periphery of the core region, having a minimum refractive index value of $n_2$ (where $n_2 < n_1$); and a second cladding region, disposed at an outer periphery of the first cladding region, having a maximum refractive index value of $n_3$ (where $n_2 < n_3 < n_1$); and that (2) it has, as characteristics with respect to light having a wavelength of 1.55 $\mu$m, an effective area of 11 $\mu m^2$ or less, a cutoff wavelength $\mu_c$ of at least 0.7 $\mu$m but not exceeding 1.6 $\mu$m at a fiber length of 2 m, and a nonlinear coefficient of at least 18/W/km.

This optical fiber does not use a single-cladding structure but a double-cladding structure in which first and second cladding regions are disposed at the outer periphery of the core region. As a consequence, the cutoff wavelength $\lambda_c$ can sufficiently be shortened even when, in order to increase the nonlinear coefficient $\gamma$, the concentration of $GeO_2$ added into the core is enhanced so as to raise the nonlinear refractive index, or the relative refractive index difference between the core and cladding is increased so as to reduce the effective area $A_{\mathit{eff}}$. Also, this configuration can make the dispersion slope negative.

Here, as for the cladding structure, one or more other cladding regions each having a predetermined refractive index value and a width may be formed between the above-mentioned first and second cladding regions.

The nonlinear optical fiber in accordance with the present invention is the above-mentioned optical fiber characterized in that it utilizes a nonlinear optical phenomenon exhibited when a predetermined wavelength of light is fed therein. When the high nonlinearity in the optical fiber is actively utilized, a nonlinear optical fiber, applicable to various purposes, having a favorable characteristic can be obtained.

The optical amplifier in accordance with the present invention comprises (a) the above-mentioned nonlinear optical fiber having a cutoff wavelength $\lambda_c$; and (b) an excitation light source for supplying excitation light having a predetermined wavelength $\lambda_p$ (where $\lambda_c < \lambda_p$) to the nonlinear optical fiber with respect to signal light having a wavelength $\lambda_s$ fed into the nonlinear optical fiber; wherein (c) a nonlinear optical phenomenon exhibited in the nonlinear optical fiber is utilized for optically amplifying the signal light.

Thus configured optical amplifier is utilizable as a Raman amplifier using the stimulated Raman effect occurring in the nonlinear optical fiber. Also, thus configured nonlinear optical fiber can make the cutoff wavelength $\lambda_c$ shorter than the wavelength $\lambda_p$ of the excitation light (pumping light), whereby optical amplification can be carried out with a high efficiency in a single mode.

The wavelength converter in accordance with the present invention comprises (a) the above-mentioned nonlinear optical fiber having a cutoff wavelength $\lambda_c$; and (b) an excitation light source for supplying excitation light having a predetermined wavelength $\lambda$ (where $\lambda_c < \lambda_p$) to the nonlinear optical fiber with respect to signal light having a wavelength $\lambda_s$ (where $\lambda_c < \lambda_s$) fed into the nonlinear optical fiber; wherein (c) a nonlinear optical phenomenon exhibited in the nonlinear optical fiber is utilized for converting the wavelength of the signal light so as to output converted light having a wavelength $\lambda_s'$ (where $\lambda_c < \lambda_s'$).

Thus configured wavelength converter is utilizable as a wavelength converter using the four-wave mixing occurring in the nonlinear optical fiber. Also, thus configured nonlinear optical fiber can make the cutoff wavelength $\lambda_c$ shorter than each of the wavelengths of signal light, converted light, and excitation light, whereby wavelength conversion can be carried out with a high efficiency in a single mode. Further, the signal light can keep a favorable transmission characteristic without being affected by mode dispersion.

The method of making an optical fiber in accordance with the present invention comprises (1) a first step of preparing a core glass rod to become a core region made of $SiO_2$ doped with a predetermined amount of $GeO_2$ by synthesizing glass by VAD or OVD method and extending thus synthesized glass so as to attain a predetermined outer diameter; (2) a second step of preparing a first cladding glass pipe to become a first cladding region made of $SiO_2$ doped with a predetermined amount of F by synthesizing glass by VAD or OVD method and extending thus synthesized glass so as to attain a predetermined inner diameter and a predetermined outer diameter; (3) a third step of heating the first cladding glass pipe while causing a predetermined gas to flow on an inner face thereof and carrying out etching for smoothing the inner peripheral surface thereof; (4) a fourth step of inserting the core glass rod into the first cladding glass pipe, baking the core glass rod and first cladding glass pipe at a predetermined temperature of at least 1300° C., and then integrating the core glass rod and first cladding glass pipe together upon heating so as to yield an intermediate glass rod; (5) a fifth step of adjusting the ratio between the respective outer diameters of the core region and first cladding region in the intermediate glass rod, and then forming a glass body to become a second cladding region on an outer periphery of the intermediate glass rod so as to prepare an optical fiber preform; and (6) a sixth step of drawing the optical fiber preform upon heating so as to prepare an optical fiber comprising, at least, the core region having a maximum refractive index value of $n_1$; the first cladding region, disposed at an outer periphery of the core region, having a minimum refractive index value of $n_2$ (where $n_2 < n_1$); and the second cladding region, disposed at an outer periphery of the first cladding region, having a maximum refractive index value of $n_3$ (where $n_2 < n_3 < n_1$); (7) wherein the core glass rod and first cladding glass pipe are integrated upon heating in the fourth step under a condition where the heating temperature is not higher than 1800° C., the outer peripheral surface of the core glass rod has a roughness of 5 $\mu$m or less, the inner peripheral surface of the first cladding glass pipe has a roughness of 5 $\mu$m or less, and the $GeO_2$ concentration in an area having a thickness of 2 $\mu$m or less from the outer peripheral surface of the core glass rod has a maximum value of 5 mol % or less; and (8) wherein the optical fiber prepared in the sixth step has, as characteristics with respect to light having a wavelength of 1.55 $\mu$m, an effective area of 11 $\mu$m$^2$ or less, a cutoff wavelength $\lambda_c$ of at least 0.7 $\mu$m but not exceeding 1.6 $\mu$m at a fiber length of 2 m, and a nonlinear coefficient of at least 18/W/km.

Such a method of making an optical fiber can prepare an optical fiber of a double-cladding structure having a high nonlinearity with such a favorable transmission characteristic that, for example, the transmission loss is lowered.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a table showing the dependence of the number of generated bubbles upon the heating temperature;

FIG. 3 is a table showing the dependence of the number of generated bubbles upon the baking temperature;

FIG. 4 is a table showing the dependence of the number of generated bubbles upon the surface roughness of the first cladding glass pipe;

FIG. 5 is a table showing the dependence of the number of generated bubbles upon the surface roughness of the core glass rod;

FIG. 6 is a table showing the dependence of the number of generated bubbles upon the $GeO_2$ concentration in an area having a thickness of 2 $\mu$m or less from the outer peripheral surface in the core glass rod;

FIG. 7 is a view schematically showing the cross-sectional structure and refractive index profile of a second embodiment of the optical fiber;

FIG. 9 is a table showing various characteristics at a wavelength of 1550 nm of the optical fibers shown in FIGS. 8A and 8B;

FIG. 13 is a table showing various characteristics at a wavelength of 1550 nm of the optical fibers shown in FIG.

FIG. 14 is a table showing various characteristics at a wavelength of 1550 nm of optical fibers E1 to E8;

FIG. 16 is a table showing various characteristics at a wavelength of 1550 nm of optical fibers F1 to F3;

DETAILED DESCRIPTION OF THE PREFERRED EMBODIMENTS

Figure 1:
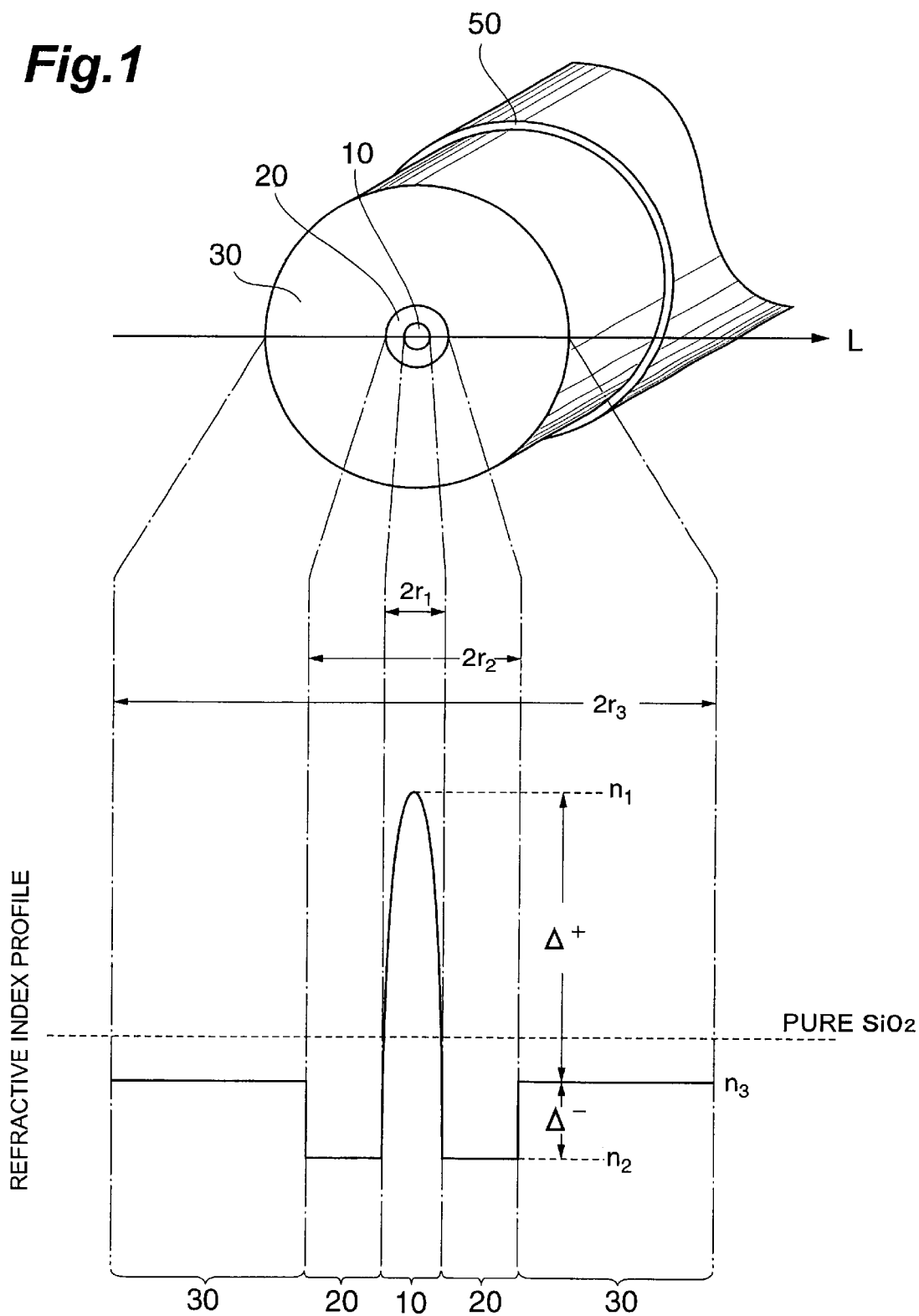
FIG. 1 is a view schematically showing the cross-sectional structure and refractive index profile of a first embodiment of the optical fiber.

In the following, preferred embodiments of the optical fiber and nonlinear optical fiber, optical amplifier and wavelength converter using the same, and method of making an optical fiber in accordance with the present invention will be explained in detail with reference to the drawings. In the explanation of the drawings, constituents identical to each other will be referred to with numerals or letters identical to each other without repeating their overlapping descriptions. The ratios of dimensions in the drawings do not always match those explained.

FIG. 1 is a view schematically showing the cross-sectional structure of a first embodiment of the optical fiber in accordance with the present invention and its refractive index profile in the fiber diameter direction (direction indicated by the depicted line L). Though different in scale, the abscissa of the refractive index profile shown in FIG. 1 corresponds to individual positions, along the line L shown in the depicted cross-sectional structure, on a cross section perpendicular to the center axis of the optical fiber. For comparison, the refractive index in pure $SiO_2$ is indicated by the dotted line for the ordinate of the refractive index profile. The individual regions in the refractive index profile are referred to with numerals identical to those referring to the respective regions in the cross-sectional structure of the optical fiber.

This optical fiber is an optical waveguide mainly composed of $SiO_2$ (silica glass); and comprises a core region 10 including the center axis of the optical fiber, a first cladding region 20 disposed at the outer periphery of the core region 10, and a second cladding region 30 disposed at the outer periphery of the first cladding region 20.

The core region 10 has an outer diameter of $2r_1$, and is formed such that pure $SiO_2$ glass is doped with a predetermined amount of $GeO_2$ as a dopant for raising the refractive index, whereby its refractive index attains a maximum value of $n_1$ ($n_1 > n_0$, where $n_0$ is the refractive index of pure $SiO_2$). As shown in FIG. 1, the core region 10 in this embodiment has a graded refractive index distribution in which the doping amount of $GeO_2$ and refractive index are maximized in the vicinity of the center axis of the optical fiber.

On the other hand, the first cladding region 20 has an outer diameter of $2r_2$, and is formed such that pure $SiO_2$ glass is doped with a predetermined amount of F as a dopant for lowering the refractive index, whereby its refractive index attains a minimum value of $n_2$ ($n_2 < n_0$, $n_2 < n_1$). The second cladding region 30 has an outer diameter of $2r_3$, and is formed by pure $SiO_2$ glass or by pure $SiO_2$ glass doped with a predetermined amount of F as a dopant for lowering the refractive index, whereby its refractive index attains a maximum value of $n_3$ ($n_3 \leq n_0$, $n_2 < n_3 < n_1$).

Here, the relative refractive index difference in each part is defined with reference to the refractive index $n_3$ in the second cladding region 30. Thus, as shown in FIG. 1, the relative refractive index difference corresponding to the refractive index $n_1$ in the core region 10 is defined by $\Delta^+ = (n_1 - n_3)/n_3 \times 100(\%)$, whereas the relative refractive index difference corresponding to the refractive index $n_2$ in the first cladding region 20 is defined by $\Delta^- = (n_2 - n_3)/n_3 \times 100(\%)$.

The optical fiber in accordance with this embodiment does not use a single-cladding structure, but a double-cladding structure in which the first cladding region 20 and second cladding region 30 are disposed at the outer periphery of the core region 10. Optical fibers having a single-cladding structure may be problematic in that the cutoff wavelength $\lambda_c$ becomes longer if the nonlinear coefficient $\gamma$ is made greater.

When a double-cladding structure is employed as mentioned above, by contrast, the cutoff wavelength $\lambda_c$ can sufficiently be shortened even when, in order to increase the nonlinear coefficient $\gamma$, the concentration of $GeO_2$ added into the core is enhanced so as to raise the nonlinear refractive index, or the relative refractive index difference between the core and cladding is increased so as to reduce the effective area $A_{eff}$. Also, this configuration can make the dispersion slope negative.

Here, as for the cladding structure, one or more other cladding regions each having a predetermined refractive index value and a width may be formed between the above-mentioned first and second cladding regions.

The optical fiber in accordance with this embodiment can be used as a nonlinear optical fiber, applicable to various purposes, having a favorable characteristic by utilizing a nonlinear optical phenomenon exhibited when a predetermined wavelength of light (within a predetermined wavelength band) is fed therein. In particular, since the cutoff wavelength $\lambda_c$ can sufficiently be shortened while the nonlinear coefficient $\gamma$ is made greater, a highly efficient optical device utilizing a nonlinear optical phenomenon can be realized. Specific characteristics of the optical fiber will be explained later in further detail.

An example of method of making an optical fiber for preparing the optical fiber (nonlinear optical fiber) having the configuration shown in FIG. 1 will now be explained. This method uses a process in which, without collectively synthesizing the core region 10 and first cladding region 20 by sooting in VAD or OVD method, a core glass rod and a first cladding glass pipe are prepared separately from each other and then are integrated together upon heating.

First, the core glass rod to become the core region 10 of the above-mentioned optical fiber is prepared (first step). Here, a glass rod mainly composed of $SiO_2$ and doped with a predetermined amount of $GeO_2$ as a dopant for raising the refractive index is synthesized by VAD or OVD method, and then is extended so as to attain a predetermined outer diameter, thus yielding the core glass rod.

Also, the first cladding glass pipe to become the first cladding region 20 of the optical fiber is prepared (second step). Here, a glass pipe mainly composed of $SiO_2$ and doped with a predetermined amount of F as a dopant for lowering the refractive index is synthesized by VAD or OVD method, and then is extended so as to attain a predetermined inner diameter and a predetermined outer diameter, thus yielding the first cladding glass pipe.

Thus obtained first cladding glass pipe is subjected to vapor-phase etching for smoothing the inner peripheral surface of the glass pipe (third step). Here, a predetermined gas such as $SF_6$ is caused to flow on the inner surface of the first cladding glass pipe (e.g., to attain an atmosphere of $SF_6 + Cl_2$) and heated, so as to etch the inner surface of the pipe.

Thus obtained core glass rod and first cladding glass pipe are integrated together upon heating (fourth step). The core glass rod is inserted into the first cladding glass pipe, and they are integrated together upon heating in conformity to the proceeding and conditions explained later, whereby an intermediate glass rod is prepared.

Subsequently, the outer diameters of the core region and first cladding region in the intermediate glass rod are adjusted so as to attain a predetermined ratio, and then a glass body to become the second cladding region 30 is formed on the outer periphery of the intermediate glass rod, whereby an optical fiber preform is prepared (fifth step).

Here, the outer diameter ratio in the intermediate glass rod is adjusted by grinding the outer peripheral part thereof with HF solution or the like. The grinding is necessary for removing the OH group and foreign matters of metal and the like in a flame attached to the glass surface, in the case where a flame such as a oxygen-hydrogen flame is employed as a heat source in the step of integrating upon heating or in the step of extending, while being in contact with the glass surface.

The glass body to become the second cladding region 30 may be synthesized by VAD or OVD method, for example. Alternatively, it may be formed by rod-in-collapse or further synthesized by VAD or OVD method after the rod-in-collapse.

Thus obtained optical fiber preform is drawn upon heating, so as to prepare an optical fiber (sixth step). The foregoing steps yield an optical fiber having the double-cladding structure shown in FIG. 1.

The fourth step of integrating the core glass rod and first cladding glass pipe upon heating will further be explained in terms of its proceeding and conditions.

If the core region and first cladding region are collectively synthesized in the method of making an optical fiber having a double-cladding structure, $GeO_2$ and F will mutually diffuse within a glass fine particle body (soot body) in which dopants are likely to diffuse, since the $GeO_2$ doping concentration and F doping concentration are high in the core region and first cladding region, respectively. Here, defects such as $GeF_4$ and GeO exist, thereby deteriorating the transmission loss. Also, MCVD method may be problematic in that the transmission loss greatly deteriorates when synthesizing $SiO_2$ glass doped with a high concentration of $GeO_2$.

In the above-mentioned manufacturing method, by contrast, the core region 10 and the first cladding region 20 are synthesized separately (first and second steps), and then are integrated upon heating (fourth step). Even in this case, however, $GeO_2$ and F may react with each other at the time of integration upon heating, so as to yield a gas such as GeO, which may remain as bubbles at the interface between the core region 10 and first cladding region 20. Here, thus remaining bubbles may deteriorate characteristics such as transmission loss or mechanical strength of the optical fiber.

In this manufacturing method, in order to suppress the occurrence of such bubbles, the integration upon heating is carried out under one of or any combination of the following five conditions in the fourth step. Namely, (1) integration is carried out at a heating temperature of 1800° C. or lower; (2) baking is carried out at a predetermined temperature of at least 1300° C. in a $Cl_2$ atmosphere before the integration upon heating; (3) the inner peripheral surface of the first cladding glass pipe is caused to have a roughness of 5 μm or less; (4) the outer peripheral surface of the core glass rod is caused to have a roughness of 5 μm or less; and (5) the $GeO_2$ concentration in an area having a thickness of 2 μm or less from the outer peripheral surface of the core glass rod is caused to have a maximum value of 5 mol % or less. The occurrence of bubbles can be suppressed when the integration upon heating is carried out while employing one of or any combination of the foregoing five conditions.

Effects of the above-mentioned manufacturing conditions were verified by carrying out the integration upon heating while changing conditions. As for the core glass rod, the refractive index distribution form within the core was made substantially parabolic, whereas the $GeO_2$ doping concentration was 30 mol % at the maximum. The outer diameter of the core glass rod at the time of integration upon heating was 6 mm. As f or the first cladding glass pipe, the refractive index distribution form within the first cladding was substantially stepped, whereas the F doping concentration was 1.5 mol % at the maximum.

At the time of integration upon heating, the first cladding glass pipe had an outer diameter of 32 mm and an inner diameter of 9 mm. Thus obtained first cladding glass pipe was etched with 300 cm³/min of $SF_6$ and 200 cm³/min of $Cl_2$ at a heating temperature of 1500° C. (the maximum temperature of glass surface measured by a pyroscope), so as to smooth the surface. The atmosphere gas within the pipe at the time of integration upon heating was constituted by 200 cm³/min of chlorine and 300 cm³/min of oxygen, whereas the degree of vacuum was 1 kPa therewithin.

First, the effect of suppressing the occurrence of bubbles was verified concerning the condition that (1) integration was carried out at a heating temperature of 1800° C., or lower. Here, while changing the heating temperature for integration upon heating within the range of 1950° C. to 1800° C., the core glass rod and the first cladding glass pipe were integrated upon heating. As for the other conditions, baking was carried out at 1300° C., the roughness of the inner surface of the first cladding glass pipe was 5 μm, the roughness of the outer peripheral surface of the core glass rod was 5 μm, and the $GeO_2$ concentration in an area having a thickness of 2 μm or less from the outer peripheral surface of the core glass rod had a maximum value of 5 mol %.

FIG. 2 shows the number of bubbles generated at the interface between the core glass rod and first cladding glass pipe. Here, the number of generated bubbles was evaluated by the number of bubbles occurring per a length of 10 mm (in the glass rod) after collapsing. As can be seen from the table of FIG. 2, the number of generated bubbles was reduced as the heating temperature was lowered, and substantially no bubbles occurred at a heating temperature of 1800° C. This is because of the fact that chemical reactions are restrained from proceeding when the heating temperature for integration upon heating is lowered.

Next, the effect of suppressing the occurrence of bubbles was verified concerning the condition that (2) baking was carried out at a predetermined temperature of at least 1300° C. in a $Cl_2$ atmosphere before the integration upon heating. Here, the integration upon heating was carried out while changing the baking temperature within the range of 1000° C. to 1300° C. As for the other conditions, the heating temperature was 1800° C., the roughness of the inner surface of the first cladding glass pipe was 5 μm, the roughness of the outer peripheral surface of the core glass rod was 5 μm, and the $GeO_2$ concentration in an area having a thickness of 2 μm or less from the outer peripheral surface of the core glass rod had a maximum value of 5 mol %.

FIG. 3 shows the number of bubbles generated at the interface between the core glass rod and first cladding glass pipe. As can be seen from the table of FIG. 3, the number of generated bubbles was reduced as the baking temperature was raised, and substantially no bubbles occurred at a baking temperature of 1300° C. This is because of the fact that baking at a sufficient temperature eliminates unstable Ge and F compounds in the surface layer and smoothes the surface state.

Next, the effect of suppressing the occurrence of bubbles was verified concerning the condition that (3) the inner peripheral surface of the first cladding glass pipe was caused to have a surface roughness of 5 μm or less. Here, the integration upon heating was carried out while the roughness of the inner peripheral surface of the glass pipe was changed within the range of 10 μm to 5 μm. As for the other conditions, the baking was carried out at a temperature of 1300° C., the heating temperature was 1800° C., the roughness of the outer peripheral surface of the core glass rod was 5 μm, and the $GeO_2$ concentration in an area having a thickness of 2 μm or less from the outer peripheral surface of the core glass rod had a maximum value of 5 mol %.

FIG. 4 shows the number of bubbles generated at the interface between the core glass rod and first cladding glass pipe. As can be seen from the table of FIG. 4, the number of generated bubbles was reduced as the roughness of the inner peripheral surface of the first cladding glass pipe was lowered, and substantially no bubbles occurred at a surface roughness of 5 μm. This is because of the fact that a sufficiently smooth surface prevents rough surface parts from becoming nuclei for generating bubbles.

Next, the effect of suppressing the occurrence of bubbles was verified concerning the condition that (4) the outer peripheral surface of the core glass rod is caused to have a roughness of 5 μm or less. Here, the integration upon heating was carried out while the roughness of the outer peripheral surface of the glass rod was changed within the range of 10 μm to 5 μm. As for the other conditions, the baking was carried out at a temperature of 1300° C., the heating temperature was 1800° C., the roughness of the inner peripheral surface of the first cladding glass pipe was 5 μm, and the $GeO_2$ concentration in an area having a thickness of 2 μm or less from the outer peripheral surface of the core glass rod had a maximum value of 5 mol %.

FIG. 5 shows the number of bubbles generated at the interface between the core glass rod and first cladding glass pipe. As can be seen from the table of FIG. 5, the number of generated bubbles was reduced as the roughness of the outer peripheral surface of the core glass rod is lowered, and substantially no bubbles occurred at a surface roughness of 5 μm. This is because of the fact that, as in the case of glass pipe, a sufficiently smooth surface prevents rough surface parts from becoming nuclei for generating bubbles.

Next, the effect of suppressing the occurrence of bubbles was verified concerning the condition that (5) the $GeO_2$ concentration in an area having a thickness of 2 μm or less from the outer peripheral surface of the core glass rod was caused to have a maximum value of 5 mol % or less. Here, the integration upon heating was carried out while the maximum value of the $GeO_2$ concentration in the above-mentioned area was changed within the range of 10 mol % to 5 mol %. As for the other conditions, the baking was carried out at a temperature of 1300° C., the heating temperature was 1800° C., the roughness of the inner peripheral surface of the first cladding glass pipe was 5 μm, and the roughness of the outer peripheral surface of the core glass rod was 5 μm.

FIG. 6 shows the number of bubbles generated at the interface between the core glass rod and first cladding glass pipe. As can be seen from the table of FIG. 6, the number of generated bubbles was reduced as the maximum value of the $GeO_2$ concentration was lowered, and substantially no bubbles occurred at a maximum value of $GeO_2$ concentration of 5 mol %. This is because of the fact that the $GeO_2$ concentration in the surface layer is lowered, whereby bubbles are harder to occur.

The integration upon heating was carried out while employing the foregoing condition where the baking was carried out at a temperature of 1300° C., the heating temperature was 1800° C., the roughness of the inner peripheral surface of the first cladding glass pipe was 5 μm, the roughness of the outer peripheral surface of the core glass rod was 5 μm, and the $GeO_2$ concentration in an area having a thickness of 2 μm or less from the outer peripheral surface of the core glass rod had a maximum value of 5 mol %, whereby an intermediate glass rod (first intermediate glass rod) having an outer diameter of 30 mm without bubbles was obtained.

After the first intermediate glass rod was extended so as to attain an outer diameter of 8 mm, the outer peripheral part thereof was ground with HF solution so as to attain an outer diameter of 5.4 mm, whereby the ratio of the core diameter to the first cladding diameter was adjusted to 0.30. Separately from the first intermediate glass rod, a second cladding glass pipe to become the inner peripheral part of the second cladding region 30 was prepared. The second cladding glass pipe was formed as an $SiO_2$ glass pipe, doped with 0.7 mol % of F, having an outer diameter of 32 mm and an inner diameter of 8 mm. The first intermediate glass rod was inserted into the second cladding glass pipe, and they were integrated upon heating, whereby a second intermediate glass rod having an outer diameter of 30 mm was obtained.

Then, a glass body to become the outer peripheral part of the second cladding region 30 was synthesized as $SiO_2$ glass doped with 0.7 mol % of F, as with the second cladding glass pipe, by VAD or OVD method, whereby an optical fiber preform was prepared. Here, the ratio of the second cladding diameter to the first cladding diameter was set to 7.8.

In the above-mentioned method of synthesizing the second cladding region 30, the inner peripheral part thereof is formed by integrating the glass pipe upon heating. This aims at reducing the amount of OH group mingling into the optical fiber when the latter is formed. The outer peripheral part thereof is formed by a sooting technique of VAD or OVD method. This aims at increasing the size of the optical fiber preform.

As such a method of synthesizing the second cladding region 30, various techniques may be used depending on individual conditions. For example, the integration of the glass pipe upon heating may be omitted in the case where the power field distribution of light does not widen so much and the influence of the OH group mingled upon synthesizing the second cladding by the sooting technique is negligible. Alternatively, the second cladding may be synthesized by the integration of the glass pipe upon heating alone without the sooting technique.

The optical fiber preform prepared in conformity to the foregoing manufacturing method and manufacturing conditions was drawn upon heating, whereby an optical fiber having the double-cladding structure shown in FIG. 1 was obtained. Its configuration was such that the outer diameter $2r_1$ 4.8 μm and the relative refractive index difference $\Delta^+$=3.3% in the core region 10, the outer diameter $2r_2$=16 μm and the relative refractive index difference $\Delta^-$=−0.25% in the first cladding region 20, and the outer diameter $2r_3$=125 μm in the second cladding region 30.

With respect to light having a wavelength of 1.5 μm, the optical fiber exhibited characteristics of:

dispersion=+0.22 ps/km/nm;
dispersion slope=+0.045 ps/km/nm²;
effective area $A_{eff}$=10.4 μm²;

cutoff wavelength $\lambda_c$=1510 nm;
zero-dispersion wavelength=1545 nm;
transmission loss=0.46 dB/km;
mode field diameter=3.69 µm;
nonlinear coefficient γ=20.8/W/km; and
polarization mode dispersion PMD=0.05 ps/√km;
whereby an optical fiber (nonlinear optical fiber) having favorable characteristics was obtained.

The above-mentioned characteristics of the optical fiber satisfy the following characteristic conditions with respect to light having a wavelength of 1.55 µm:

an effective area $A_{\it eff}$ of 11 µm² or less;

a cutoff wavelength $\lambda_c$ of at least 0.7 µm but not exceeding 1.6 µm at a fiber length of 2 m; and a nonlinear coefficient γ of at least 18/W/km.

Also, the transmission loss with respect to light having a wavelength of 1.55 µm satisfies a characteristic condition of not greater than 3.0 dB/km, or not greater than 1.0 dB/km.

When a double-cladding structure is employed as such, a highly nonlinear optical fiber having a favorable cutoff wavelength $\lambda_c$ can be obtained even in the case where the GeO$_2$ concentration of the core is raised while the effective area $A_{\it eff}$ is reduced so as to enhance the nonlinear coefficient γ.

For making the effective area $A_{\it eff}$ sufficiently small, it is preferred that the relative refractive index difference $\Delta^+$ between the core region 10 and the second cladding region 30 be at least 2.7%. Though the cutoff wavelength $\lambda_c$ becomes longer in the single-cladding structure when such a large refractive index difference is made, it can sufficiently be shortened in the double-cladding structure as mentioned above.

FIG. 7 is a view schematically showing the cross-sectional structure of a second embodiment of the optical fiber in accordance with the present invention and its refractive index profile in the fiber diameter direction (direction indicated by the depicted line L).

This optical fiber is an optical waveguide mainly composed of SiO$_2$ (silica glass); and comprises a core region 10 including the center axis of the optical fiber, a first cladding region 20 disposed at the outer periphery of the core region 10, and a second cladding region 30 disposed at the outer periphery of the first cladding region 20. Here, the first cladding region 20 and the second cladding region 30 are configured as in the first embodiment.

On the other hand, the core region 10 has an outer diameter of $2r_1$ and is formed such that pure SiO$_2$ glass is doped with a predetermined amount of GeO$_2$ as a dopant for raising the refractive index, so that its refractive index attains a maximum value of $n_1$ ($n_1>n_0$). As shown in FIG. 7, the core region 10 in this embodiment has a graded refractive index distribution in which the doping amount of GeO$_2$ and the refractive index are maximized in the vicinity of the center axis of the optical fiber.

In a predetermined area on the outer periphery side within the core region 10, an intermediate region 15 is provided at a position held between the core region 10 and the first cladding region 20. As shown in FIG. 7, the intermediate region 15 is doped with a relatively high concentration of GeO$_2$ so as to yield a refractive index distribution (doping concentration distribution) protruded like a horn. Here, the maximum value of the refractive index of the intermediate region 15 is defined as $n_5$ ($n_5>n_0$), and its relative refractive index difference is $\Delta_5=(n_5-n_3)/n_3$.

As with the optical fiber in accordance with the first embodiment, the optical fiber in accordance with this embodiment does not use a single-cladding structure but a double-cladding structure in which the first cladding region 20 and the second cladding region 30 are disposed at the outer periphery of the core region 10. This makes it possible to sufficiently shorten the cutoff wavelength $\lambda_c$ even when, in order to increase the nonlinear coefficient γ, the concentration of GeO$_2$ added into the core is enhanced so as to raise the nonlinear refractive index, or the relative refractive index difference between the core and cladding is increased so as to reduce the effective area $A_{\it eff}$. Also, this configuration can make the dispersion slope negative. The effect of the intermediate region 15 will be explained later together with the method of making an optical fiber.

The optical fiber of this embodiment can also be used as a nonlinear optical fiber, applicable to various purposes, having a favorable characteristic by utilizing a nonlinear optical phenomenon exhibited when light having a predetermined wavelength (within a predetermined wavelength band) is fed therein.

An example of method of making an optical fiber for preparing an optical fiber (nonlinear optical fiber) having the configuration shown in FIG. 7 will now be explained.

First, a glass fine particle body (soot body) constituted by an area to become the core region 10 including the intermediate region 15 and a precursor area to become the first cladding region 20 was synthesized. Here, the area to become the core region 10 was made of SiO$_2$ glass doped with GeO$_2$ by 30 mol % at the maximum, whereas the area, in the outer peripheral part thereof, corresponding to the intermediate region 15 was made of SiO$_2$ glass doped with GeO$_2$ so as to yield a horn-like distribution as mentioned above such that its doping concentration at the peak value became 5 mol %. On the outer periphery thereof, the precursor area for the first cladding region 20 was synthesized as pure SiO$_2$ glass.

Thus obtained glass fine particle body (glass porous body) was put into a sintering furnace, and was heated in a mixed atmosphere of chlorine and helium at a heating temperature of 1300° C. so as to be dehydrated. Thus dehydrated product was heated in a helium atmosphere at a heating temperature of 1400° C., so that areas to become the core region 10 and intermediate region 15 were selectively densified (transparentized).

Here, since the areas to become the core region 10 and intermediate region 15 were doped with a high concentration of GeO$_2$ so as to lower the densifying temperature, the densifying effect caused by heating was sufficiently obtained therein. By contrast, the densifying temperature was high in the precursor area for the first cladding region 20, since it was made of pure SiO$_2$ glass, whereby it remained the glass fine particle body without being densified upon heating at 1400° C.

In this state, the glass body was heated at a heating temperature of 1400° C. in a mixed atmosphere of helium and gas for doping F, such as $C_2F_6$, $SiF_4$, and $CF_4$, and the precursor area for the first cladding region 20 not densified yet was doped with F by a doping concentration of 1 mol %, whereby the first cladding region 20 was formed.

When the glass fine particle body is doped with F at the time of sintering upon heating as such, F added to the cladding may also enter the core region in a normal method. This may be problematic in that the refractive index of the core region decreases while impurities such as GeO and Ge—F compounds occur so as to deteriorate the transmission loss. In the manufacturing method in accordance with this embodiment, by contrast, the intermediate region 15 doped with a high concentration of GeO$_2$ is formed in the outer peripheral part of the core region 10, and these areas are selectively densified by heating at a relatively low temperature. Then, F is added thereto, whereby F can selectively be added to only the precursor area for the first cladding region 20.

On the outer periphery of thus obtained glass body, a glass body to become the second cladding region 30 was formed, whereby an optical fiber preform was prepared. Here, the second cladding region 30 was $SiO_2$ glass doped with F by a doping concentration of 0.3 mol %. The outer diameter ratios of the individual regions were such that the ratio of the core diameter to the first cladding diameter was 0.40, whereas the ratio of the second cladding diameter to the first cladding diameter was 11.6.

The optical fiber preform prepared in conformity to the foregoing manufacturing method and manufacturing conditions was drawn upon heating, whereby an optical fiber having the double-cladding structure shown in FIG. 7 was obtained. Its configuration was such that the outer diameter $2r_1=4.3$ μm and the relative refractive index difference $\Delta^+=3.1\%$ in the core region 10, the relative refractive index difference $\Delta_5=1.0\%$ in the intermediate region 15, the outer diameter $2r_2=10.8$ μm and the relative refractive index difference $\Delta^-=0.26\%$ in the first cladding region 20, and the outer diameter $2r_3=125$ μm in the second cladding region 30. The refractive index distribution (doping concentration distribution of $GeO_2$) in the core region 10 was approximately a distribution of the α~3.0 power.

With respect to light having a wavelength of 1.5 μm, the optical fiber exhibited characteristics of:
  dispersion=+0.98 ps/km/nm;
  dispersion slope=+0.035 ps/km/nm²;
  effective area $A_{eff}=10.2$ μm²;
  cutoff wavelength $\lambda_c=1465$ nm;
  zero-dispersion wavelength=1520 nm;
  transmission loss=0.49 dB/km;
  mode field diameter=3.64 μm; and
  nonlinear coefficient γ=21.5/W/km;
whereby an optical fiber (nonlinear optical fiber) having favorable characteristics was obtained.

The above-mentioned characteristics of the optical fiber satisfy the following characteristic conditions with respect to light having a wavelength of 1.55 μm:
  an effective area $A_{eff}$ of 11 μm² or less;
  a cutoff wavelength $\lambda_c$ of at least 0.7 μm but not exceeding 1.6 μm at a fiber length of 2 m; and
  a nonlinear coefficient γ of at least 18/W/km.
Also, the transmission loss with respect to light having a wavelength of 1.55 μm satisfies a characteristic condition of not greater than 3.0 dB/km, or not greater than 1.0 dB/km.

When a double-cladding structure is employed as such, a highly nonlinear optical fiber having a favorable cutoff wavelength $\lambda_c$ can be obtained even in the case where the $GeO_2$ concentration of the core is raised while the effective area $A_{eff}$ is reduced so as to enhance the nonlinear coefficient γ.

For making the effective area $A_{eff}$ sufficiently small, it is preferred that the relative refractive index difference $\Delta^+$ between the core region 10 and the second cladding region 30 be at least 2.7%. Though the cutoff wavelength $\lambda_c$ becomes longer in the single-cladding structure when such a large refractive index difference is made, it can sufficiently be shortened in the double-cladding structure as mentioned above.

Preferred constitutional conditions and various characteristics of the optical fiber (nonlinear optical fiber) in accordance with the present invention will further be studied. Among the characteristics in the optical fiber indicated in the following, those dependent on the wavelength refer to characteristics with respect to light having a wavelength of 1.55 μm unless otherwise specified.

First, the transmission loss of thus configured optical fiber will be considered. In a highly nonlinear optical fiber, its core is doped with a high concentration of $GeO_2$ in order to increase its nonlinear refractive index so as to enhance the nonlinearity. Here, the transmission loss is likely to deteriorate due to the heating at the time of drawing. Though such deterioration of transmission loss can be suppressed when the heating temperature at the time of drawing is set low, the drawing at a low temperature may be problematic in that the optical fiber is likely to break, since the excess tension occurs within the optical fiber during the drawing.

In the optical fibers having the double-cladding structures shown in FIGS. 1 and 7, it is preferred that the second cladding region 30 occupying a major part of the volume of the optical fiber be doped with F (fluorine). This can lower the softening temperature in the second cladding region 30, so that the drawing temperature can be lowered, whereby the transmission loss can be restrained from deteriorating.

Figure 8A:
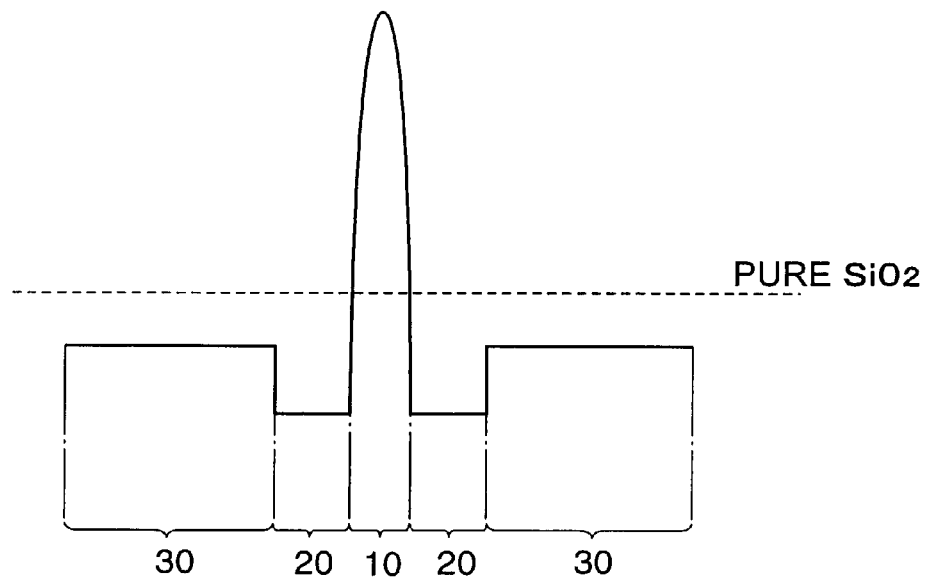
FIGS. 8A and 8B are views showing respective refractive index profiles of optical fibers A1 and A2.
Figure 8B:
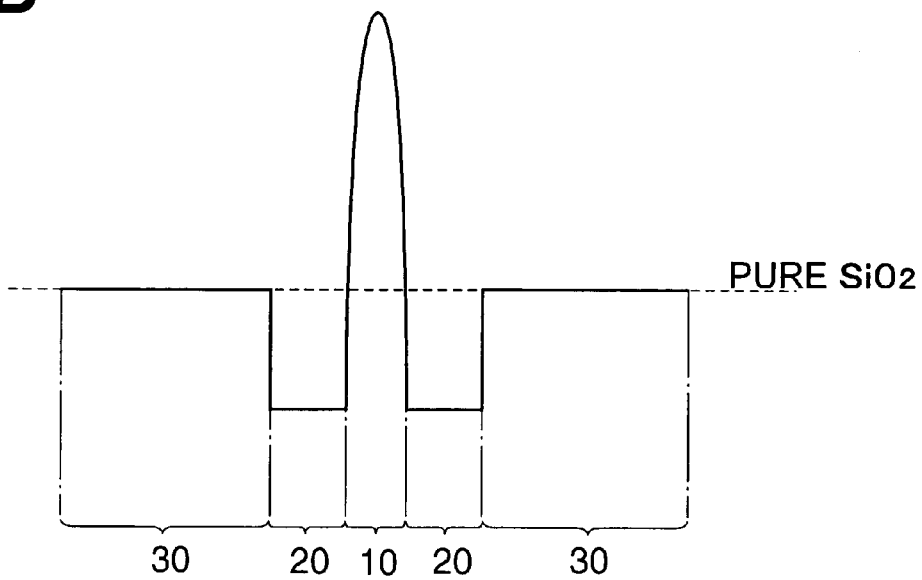

Concerning the reduction in transmission loss, two kinds of optical fibers A1 and A2 having the respective structures shown in the refractive index profiles of FIGS. 8A and 8B were made as prototypes.

While employing the refractive index profile shown in FIG. 8A, the optical fiber A1 was prepared such that the core region 10 was made of $SiO_2$ doped with a parabolic distribution of $GeO_2$ (with a maximum doping concentration of 30 mol %), the first cladding region 20 was made of $SiO_2$ doped with F (with a doping amount of 1.6 mol %), and the second cladding region 30 was made of $SiO_2$ doped with F (with a doping concentration of 0.9 mol %).

While employing the refractive index profile shown in FIG. 8B, the optical fiber A2 was prepared such that the core region 10 was made of $SiO_2$ doped with a parabolic distribution of $GeO_2$ (with a maximum doping concentration of 30 mol %), the first cladding region 20 was made of $SiO_2$ doped with F (with a doping concentration of 1.6 mol %), and the second cladding region 30 was made of pure $SiO_2$.

Each of the optical fibers A1 and A2 was drawn with a tension of 4 N (400 gw) at a process speed of 300 m/min. Here, the highest temperature on the glass surface was 1900° C. in the optical fiber A1 and 2000° C. in the optical fiber A2, whereby the optical fiber A1 was adapted to be drawn at a lower temperature.

FIG. 9 shows various characteristics of thus obtained optical fibers A1 and A2. From the table of FIG. 9, it can be seen that the optical fiber A1 in which the second cladding region 30 is doped with F yields a lower transmission loss and a greater nonlinear coefficient γ as compared with the optical fiber A2.

The cutoff wavelength $\lambda_c$, effective area $A_{eff}$, and nonlinear coefficient γ in optical fibers will now be studied. In a highly nonlinear optical fiber, as mentioned above, it is preferred that the core be doped with a high concentration of $GeO_2$ so as to increase the nonlinear refractive index, and that the effective area $A_{eff}$ be reduced. Here, the cutoff wavelength $\lambda_c$ becomes longer while the nonlinear coefficient γ becomes greater. When an optical fiber having a double-cladding structure is used, by contrast, the cutoff wavelength $\lambda_c$ can sufficiently be shortened while increasing the nonlinear coefficient γ.

When a nonlinear optical fiber is to be employed in wavelength conversion using four-wave mixing, it is necessary that the dispersion value at the wavelength $\lambda_p$ of excitation light for wavelength conversion be substantially zero since phases are required to match among signal, pump, and converted wavelengths. Therefore, it is desirable that $\lambda_p$ be located in the vicinity of the zero-dispersion wavelength. With respect to signal light having a wavelength $\lambda_s$, the wavelength $\lambda_s'$ of the wavelength-converted light is:

$$\lambda_s' = \lambda_p - (\lambda_s - \lambda_p).$$

For example, when WDM signal light whose wavelength ranges from 1530 nm to 1565 nm is collectively wavelength-converted by excitation light having a wavelength of 1525 nm, the wavelength of converted light ranges from 1520 nm to 1490 nm. It is necessary for the cutoff wavelength $\lambda_c$ to attain a suitable value in view of the wavelength of signal light, converted light, excitation light, amplification light, or the like.

Figure 10A:
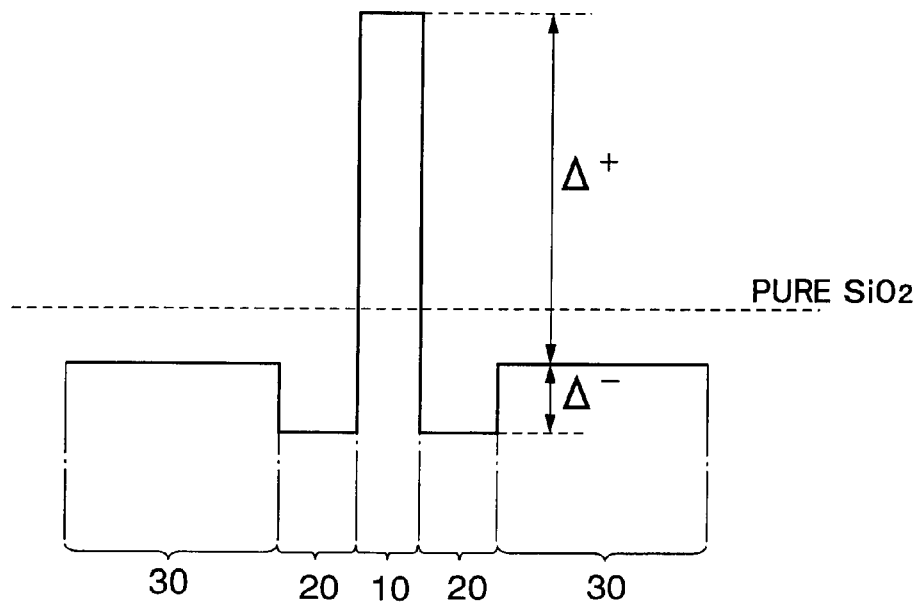
FIGS. 10A and 10B are views showing respective refractive index profiles of optical fibers B1 and B2, C1 and C2.
Figure 10B:
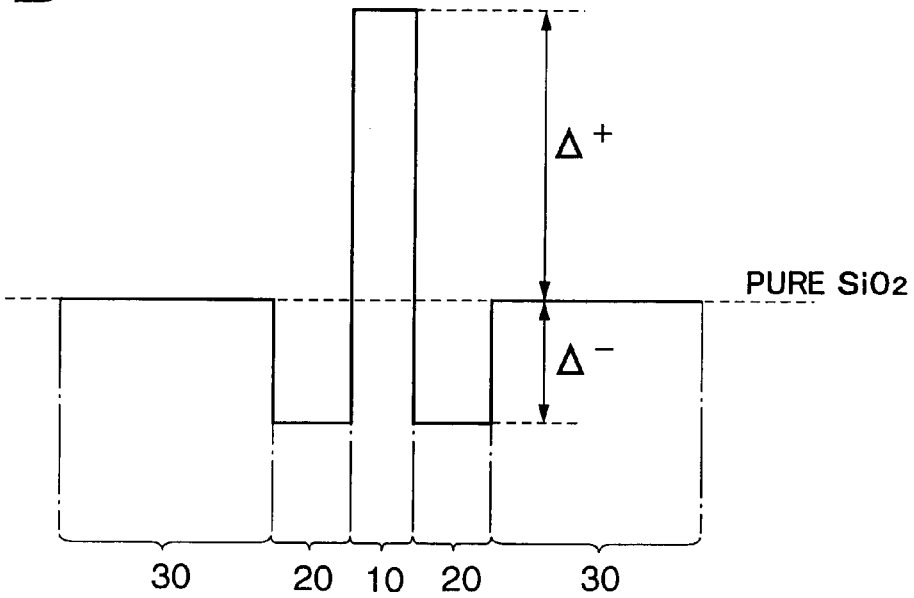

Concerning the cutoff wavelength $\lambda_c$, effective area $A_{eff}$, and nonlinear coefficient $\gamma$, four kinds of optical fibers B1, B2, C1, and C2 having their corresponding structures shown in the refractive index profiles of FIGS. 10A and 10B were made as prototypes.

Employing the refractive index profile shown in FIG. 10A, each of the optical fibers B1 and B2 was prepared such that the core region 10 was made of $SiO_2$ doped with $GeO_2$ in a stepped form of distribution, the first cladding region 20 was made of $SiO_2$ doped with F (with a doping concentration of 2.1 mol %), and the second cladding region 30 was made of $SiO_2$ doped with F (with a doping concentration of 0.9 mol %). The doping concentration of $GeO_2$ in the core region 10 differed between the optical fibers B1 and B2.

Employing the refractive index profile shown in FIG. 10B, each of the optical fibers C1 and C2 was prepared such that the core region 10 was made of $SiO_2$ doped with $GeO_2$ in a stepped form of distribution, the first cladding region 20 was made of $SiO_2$ doped with F (with a doping concentration of 2.1 mol %), and the second cladding region 30 was made of pure $SiO_2$. The doping concentration of $GeO_2$ in the core region 10 differed between the optical fibers C1 and C2.

For comparison, optical fibers D1 to D5 having a single-cladding structure were prepared. Each of the optical fibers D1 to D5 was prepared in conformity to the refractive index profile shown in FIG. 11. Here, numerals 60 and 70 refer to the core region and the cladding region in conformity to the single-cladding structure.

Figures 11, 12:
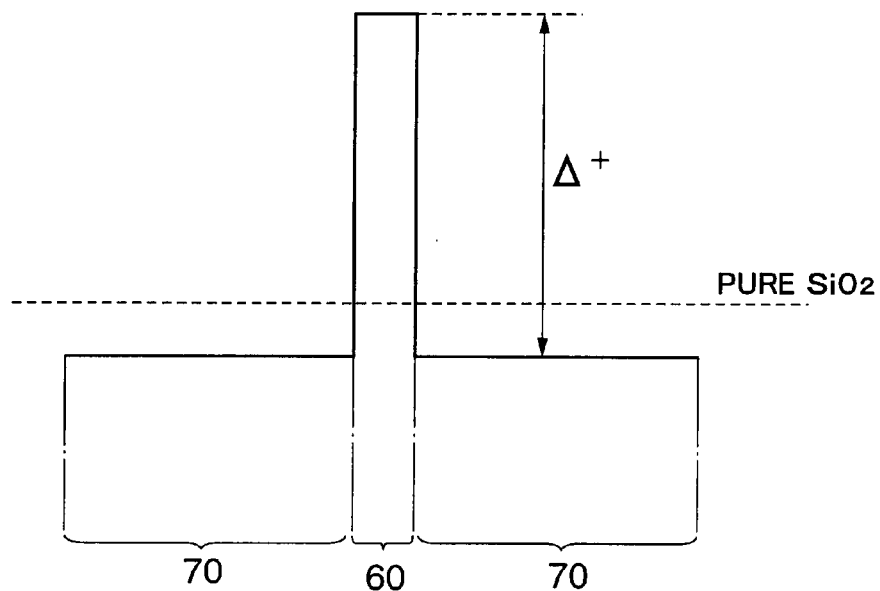
FIG. 11 is a view showing the refractive index profile of optical fibers D1 to D5.
FIG. 12 is a table showing various characteristics at a wavelength of 1550 nm of the optical fibers shown in FIGS. 10A and 10B.

Employing the refractive index profile shown in FIG. 11, each of the optical fibers D1 to D5 was prepared such that the core region 60 was made of $SiO_2$ doped with $GeO_2$ in a stepped form of distribution, the cladding region 70 was made of $SiO_2$ doped with F (with a doping concentration of 0.9 mol %). The doping concentration of $GeO_2$ in the core region 60 differed among the optical fibers D1 to D5. The relative refractive index difference $\Delta^+$ of the core region 60 was defined with reference to the cladding region 70.

FIG. 12 shows the relative refractive index differences $\Delta^+$ and $\Delta^-$ and various characteristics at a wavelength of 1550 nm of thus obtained optical fibers B1, B2, C1, and C2; whereas FIG. 13 shows the relative refractive index difference $\Delta^+$ and various characteristics of the comparative optical fibers D1 to D5. From the table of FIG. 13, it can be seen that the effective area $A_{eff}$ and the value of nonlinear coefficient $\gamma$ respectively become greater and smaller when the $GeO_2$ doping concentration in the core is lower so that $\Delta^+$ is smaller, in the optical fiber D1 to D5 with the single-cladding structure. When $\Delta^+$ is at least 2.7%, the cutoff wavelength is longer than the wavelength of the converted light obtained upon collective wavelength conversion of WDM signal light whose wavelength ranges from 1530 nm to 1565 nm by excitation light having a wavelength of 1525 nm.

By contrast, it can be seen from the table of FIG. 12 that the optical fibers B1, B2, C1, and C2 having a double-cladding structure yield a smaller effective area $A_{eff}$ and a greater nonlinear coefficient $\gamma$. In addition, a sufficiently short cutoff wavelength is realized such that, for example, the cutoff wavelength is 1469 nm while $\Delta^+$ is 4.5% (optical fiber C2), even when the effective area $A_{eff}$ is not larger than 11 $\mu m^2$ whereas the value of nonlinear coefficient $\gamma$ is not smaller than 18/W/km.

The hydrogen-resistant characteristic in the optical fiber will now be studied. If the core contains a high concentration of $GeO_2$ therein, its hydrogen-resistant characteristic is likely to deteriorate. For this matter, it is preferred that the outer peripheral part of the second cladding region 30 to become the outermost layer of the optical fiber be provided with a hermetic coat (see a hermetic coat 50 shown in FIGS. 1 and 7) mainly composed of a resistant material to the water and hydrogen molecules, such as amorphous carbon or silicon carbide.

This can block the dispersion of hydrogen into the core region and cladding region of the optical fiber. Also, the static fatigue coefficient becomes 100 to 160, so that the probability of breakage is very low. As a consequence, the long-term reliability of the optical fiber can be improved.

Eight kinds of optical fibers E1 to E8 in accordance with the present invention were made as prototypes according to the configuration, manufacturing method, and preferred manufacturing conditions of the optical fiber (nonlinear optical fiber) studied in the foregoing.

Each of the optical fibers E1 to E8 was prepared such that the core region 10 was made of $SiO_2$ doped with $GeO_2$ approximately having a refractive index distribution of the $\alpha \sim 3.0$ power, the first cladding region 20 was made of F-doped $SiO_2$, and the second cladding region 30 was made of F-doped $SiO_2$ or pure $SiO_2$. The table of FIG. 14 shows the relative refractive index differences $\Delta^+$ and $\Delta^-$, the F doping concentration of the second cladding region 30, the respective outer diameters $2r_1$ and $2r_2$ of the core region 10 and first cladding region 20, and their resulting various characteristics in thus obtained optical fibers E1 to E8. Among the listed characteristics, the OH absorption transmission loss refers to the increase (excess absorption loss) in the transmission loss at a wavelength of 1.38 $\mu m$ due to the OH group absorption.

The characteristics of optical fibers E1 to E8 shown in the table of FIG. 14 satisfy the following characteristic conditions with respect to light having a wavelength of 1.55 $\mu m$:

an effective area $A_{eff}$ of 11 $\mu m^2$ or less;

a cutoff wavelength $\lambda_c$ of at least 0.7 $\mu m$ but not exceeding 1.6 $\mu m$ at a fiber length of 2 m;

a transmission loss of 1.0 dB/km or less;

a polarization mode dispersion PMD of 0.3 ps/$\sqrt{km}$ or less; and a nonlinear coefficient $\gamma$ of at least 18/W/km.

Employing a double-cladding structure as such can yield a highly nonlinear optical fiber having a favorable cutoff wavelength $\lambda_c$ even when the $GeO_2$ concentration in the core is enhanced while the effective area $A_{eff}$ is reduced so as to increase the nonlinear coefficient $\gamma$. Also, a highly nonlinear optical fiber having a low polarization mode dispersion and a low transmission loss is obtained.

Here, the excess absorption loss caused by OH group with respect to light having a wavelength of 1.38 $\mu m$ is preferably 0.2 dB/km or less. Each of the optical fibers E1 to E8 shown in FIG. 14 satisfies this characteristic condition.

Figure 15:
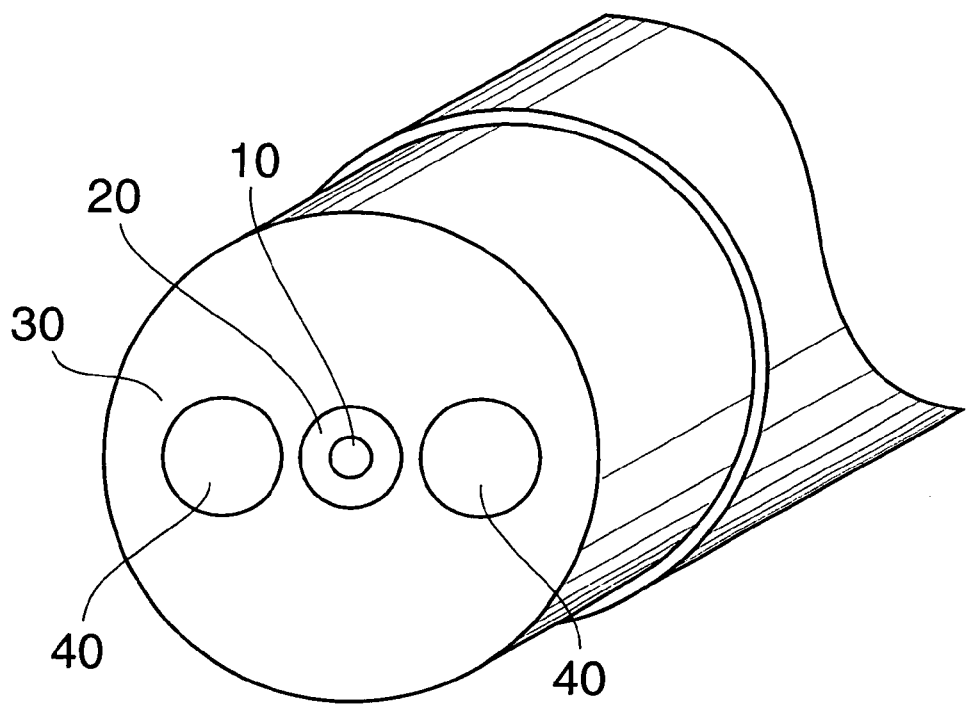
FIG. 15 is a view schematically showing the cross-sectional structure of another embodiment of the optical fiber.

When a stress providing section is provided at a predetermined part within the optical fiber, for example, a polarization-maintaining optical fiber is obtained. FIG. 15 shows the cross-sectional structure of another embodiment of the optical fiber, which is such a polarization-maintaining optical fiber. In this optical fiber, a stress providing section 40, made of $B_2O_3$-doped $SiO_2$, is formed on each of the right and left sides of the core region 10. Though the transmission loss may deteriorate due to the stress providing sections 40, the polarization-maintaining optical fiber with such a structure can suppress the random coupling between orthogonally polarized waves. As a consequence, the quality of transmitted signal light can be held favorably.

The method of making thus configured optical fiber is substantially the same as the manufacturing method mentioned above concerning the optical fiber having the configuration shown in FIG. 1, but differs therefrom in that the product in which the glass body to become the second cladding region 30 is formed on the outer periphery of the intermediate glass rod in the fifth step is used as a third intermediate glass body and is further processed without forming it into an optical fiber preform.

Namely, the first cladding region or second cladding region of thus obtained third intermediate glass body is bored, so as to form holes. A glass rod to become the stress providing section 40 is inserted into each of the holes, whereby an optical fiber preform is prepared. When this optical fiber preform is drawn upon heating, an optical fiber having the stress providing sections 40 is obtained.

An example of the above-mentioned manufacturing method will be explained. Here, the core glass rod had a substantially parabolic refractive index distribution with its $GeO_2$ doping concentration being 30 mol % at the maximum. The outer diameter of the core glass rod at the time of integration upon heating was 8 mm. On the other hand, the first cladding glass pipe was formed such that the refractive index distribution in the first cladding had a substantially stepped form with its F doping concentration being 1.5 mol % at the maximum.

At the time of integration upon heating, the first cladding glass pipe had an outer diameter of 32 mm and an inner diameter of 9 mm. Thus obtained first cladding glass pipe was etched with 300 cm$^3$/min of $SF_6$ and 200 cm$^3$/min of $Cl_2$ at a heating temperature of 1500° C. (the maximum temperature of glass surface measured by a pyroscope), so as to smooth the surface.

Before the integration upon heating, baking was carried out with 500 cm$^3$/min of $Cl_2$ at a heating temperature of 1500° C. The atmosphere gas within the pipe at the time of integration upon heating was constituted by 200 cm$^3$/min of chlorine and 300 cm$^3$/min of oxygen, whereas the degree of vacuum was 1 kPa therewithin.

The integration upon heating was carried out while employing conditions in which the heating temperature was 1700° C., the roughness of the inner peripheral surface of the first cladding glass pipe was 3 $\mu$m or less, the roughness of the outer peripheral surface of the core glass rod was 2 $\mu$m or less, and the $GeO_2$ concentration in an area having a thickness of 2 $\mu$m or less from the outer peripheral surface in the core glass rod had a maximum value of 3 mol %, whereby an intermediate glass rod (first intermediate glass rod) having an outer diameter of 30 mm without bubbles was obtained.

After the first intermediate glass rod was extended so as to attain an outer diameter of 9 mm, the outer peripheral part thereof was ground with HF solution so as to attain an outer diameter of 6 mm, whereby the ratio of the core diameter to the first cladding diameter was adjusted to 0.40. Separately from the first intermediate glass rod, a second cladding glass pipe to become the inner peripheral part of the second cladding region 30 was prepared. The second cladding glass pipe was formed as an $SiO_2$ glass pipe, made of substantially pure $SiO_2$, having an outer diameter of 32 mm and an inner diameter of 9 mm. The first intermediate glass rod was inserted into the second cladding glass pipe, and they were integrated upon heating, whereby a second intermediate glass rod having an outer diameter of 30 mm was obtained.

Then, on the outer periphery of thus obtained second intermediate glass rod, a glass body to become the outer peripheral part of the second cladding region 30 was synthesized as $SiO_2$ glass made of substantially pure $SiO_2$ as with the second cladding glass pipe by VAD or OVD method, whereby a third intermediate glass body was prepared. Here, the ratio of the second cladding diameter to the first cladding diameter was set to 10.8.

Further, the third intermediate glass body was extended so as to attain an outer diameter of 36 mm. Here, in the extended third intermediate glass body, the part corresponding to the core region 10 had an outer diameter of 1.3 mm, whereas the part corresponding to the first cladding region 20 had an outer diameter of 3.3 mm. In the third intermediate glass body, two holes to become the stress providing sections 40 shown in FIG. 15 were formed in the part corresponding to the second cladding region 30. These holes were formed such that the distance between the respective centers of the two holes was 15.2 mm with each hole having an outer diameter of 10 mm. The respective centers of the two holes and the center of the core region 10 and first cladding region 20 were substantially arranged on a single line.

Thus formed holes were ground until the inner peripheral surface attained a roughness of 2 $\mu$m or less, and then were washed with water, alcohol, and aqua regia so as to eliminate foreign matters such as abrasives and grinding dust. As a glass rod to become the stress providing section 40, a $B_2O_3$-doped $SiO_2$ glass rod having an outer diameter of 9 mm was inserted into each hole so as to be sealed therein, whereby an optical fiber preform was prepared.

The optical fiber preform prepared according to the foregoing manufacturing method and conditions was drawn upon heating, whereby an optical fiber having the structure shown in FIG. 15 was obtained. Here, the glass rod inserted in the hole was integrated with the cladding region upon heating at the time of drawing, so as to yield the stress providing section 40. The configuration of thus obtained optical fiber was such that the outer diameter $2r_1$=4.6 $\mu$m and the relative refractive index difference $\Delta^+$=3.0% in the core region 10, the outer diameter $2r_2$=11.6 $\mu$m and the relative refractive index difference $\Delta^-$=−0.5% in the first cladding region 20, and the outer diameter $2r_3$=125 $\mu$m in the second cladding region 30.

With respect to light having a wavelength of 1.55 $\mu$m, the optical fiber exhibited characteristics of:
- dispersion=+0.01 ps/km/nm;
- dispersion slope=+0.042 ps/km/nm$^2$;
- effective area $A_{eff}$=10.6 $\mu$m$^2$;
- cutoff wavelength $\lambda_c$=1349 nm;
- zero-dispersion wavelength=1550 nm;
- transmission loss=1.5 dB/km;
- mode field diameter=3.75 $\mu$m;
- nonlinear coefficient $\gamma$=20.2/W/km; and
- crosstalk between polarization modes=−20 dB (at a fiber length of 1 km);

whereby an optical fiber (nonlinear optical fiber) having favorable characteristics was obtained.

As optical fibers having such a configuration, three kinds of optical fibers F1 to F3 in accordance with the present invention were further made as prototypes.

As with the optical fibers E1 to E8, the optical fibers F1 to F3 were prepared such that the core region 10 was made of $SiO_2$ doped with $GeO_2$ approximately having a refractive index distribution of the α~3.0 power, the first cladding region 20 was made of F-doped $SiO_2$, and the second cladding region 30 was made of F-doped $SiO_2$ or pure $SiO_2$. The table of FIG. 16 shows the relative refractive index differences $\Delta^+$ and $\Delta^-$, the F doping concentration of the second cladding region 30, the respective outer diameters $2r_1$ and $2r_2$ of the core region 10 and first cladding region 20, and their resulting various characteristics in thus obtained optical fibers F1 to F3. Among the listed characteristics, the OH absorption transmission loss refers to the increase (excess absorption loss) in the transmission loss at a wavelength of 1.38 μm due to the OH group absorption.

The characteristics of optical fibers F1 to F3 shown in the table of FIG. 16 satisfy the following characteristic conditions with respect to light having a wavelength of 1.55 μm:

an effective area $A_{eff}$ of 11 $μm^2$ or less;

a cutoff wavelength $\lambda_c$ of at least 0.7 μm but not exceeding 1.6 μm at a fiber length of 2 m;

a transmission loss of 3.0 dB/km or less;

a crosstalk between polarized waves of −15 dB or less; and a nonlinear coefficient γ of at least 18/W/km.

Employing a double-cladding structure as such can yield a highly nonlinear optical fiber having a favorable cutoff wavelength $\lambda_c$ even when the $GeO_2$ concentration in the core is enhanced while the effective area $A_{eff}$ is reduced so as to increase the nonlinear coefficient γ. Also, a polarization-maintaining optical fiber having a high nonlinearity is obtained.

Here, the excess absorption loss caused by OH group with respect to light having a wavelength of 1.38 μm is preferably 0.2 dB/km or less. Each of the optical fibers F1 to F3 shown in FIG. 16 satisfies this characteristic condition.

The optical fiber having the configuration and characteristics mentioned above can yield a nonlinear optical fiber which actively utilizes a high nonlinearity and has favorable characteristics concerning the cutoff wavelength $\lambda_c$ and the like by utilizing a nonlinear optical phenomenon exhibited when a predetermined wavelength of light is fed therein. Such a nonlinear optical fiber is applicable to various optical devices utilizing nonlinear optical phenomena.

There are cases where an optical device such as an optical amplifier or wavelength converter using an optical fiber having the above-mentioned configuration as a nonlinear optical fiber employs a configuration of an optical module (e.g., optical amplifier module or wavelength converter module) in which the optical device is modularized by accommodating therein the optical fiber formed into a coil. In such a case, it is preferred that various characteristics of the optical fiber such as bending characteristics including the strength against the bending of the optical fiber and changes in bending loss be kept such that they are suitable for modularization.

For this matter, as a configuration of the optical fiber, it is preferable for the glass portion of the optical fiber to have an outer diameter of 100 μm or less. More preferably, the glass portion has an outer diameter of 90 μm or less. When the glass portion has a small outer diameter as such, an optical fiber having a sufficient strength including that against bending can be obtained even when the coating portion disposed on the outer periphery of the glass portion has a small diameter.

When the strength of the optical fiber against bending is concerned, a bending stress occurs in each part within the glass portion of the optical fiber when the optical fiber is bent so as to be accommodated as a coil within the optical module. This bending stress may cause the optical fiber to break depending on the strength of the optical fiber against bending.

Specifically, when the optical fiber is bent and wound like a coil, its resulting bending stress is substantially zero at the center part (near the center axis) of the glass portion in the optical fiber. By contrast, a compressive stress occurs within the glass portion in the part on the radially inner side of the optical fiber coil, since the bending diameter in this part is smaller than that in the center part. In the part on the radially outer side of the optical fiber coil, on the other hand, a tensile stress occurs within the glass portion, since the bending diameter in this part is greater than that in the center part. The compressive stress and tensile stress become greater as the distance from the center part of the glass portion is longer.

In the optical fiber having the above-mentioned configuration in which the glass portion has a smaller outer diameter, the part of glass portion located on the radially innermost or outermost side of the coil reduces its distance from the center part, whereby the magnitude of stress occurring within the glass portion of the optical fiber decreases. As a consequence, the strength of the optical fiber against bending is improved, whereby the optical fiber is prevented from breaking due to the stress when formed into a coil.

In the above-mentioned optical fiber of a double-cladding structure having a high nonlinearity, the extent of the electromagnetic field distribution of light transmitted in the glass portion is narrow, since the effective area $A_{eff}$ is made smaller, and so forth. Also, such an optical fiber has a large numerical aperture NA in general. Therefore, the bending loss of the above-mentioned optical fiber is small, and the smaller outer diameter of its glass portion is less influential in the transmission loss. Thus obtained is an optical fiber having a sufficient strength against bending, while reducing the bending loss, thus yielding favorable bending characteristics.

The glass portion of the optical fiber refers to the part including the core region, first cladding region, and second cladding region other than the coating portion made of a resin disposed at the outer periphery of the optical fiber and the like. In the optical fibers shown in FIGS. 1 and 7, for example, the part constituted by the core region 10, first cladding region 20, and second cladding region 30 is the glass portion. When other cladding regions made of glass are further provided at the outer periphery of the second cladding region, the part including these cladding regions as well is the glass portion.

Preferably, the coating portion disposed at the outer periphery of the glass portion has an outer diameter of 150 μm or less. More preferably, the outer diameter of the coating portion is 120 μm or less. When the coating portion has a small outer diameter as such, the optical module can be made smaller when the optical fiber is formed into a coil so as to be accommodated in the optical module. When the size of the optical module is fixed, a longer optical fiber can be formed into a coil so as to be accommodated therein.

When characteristics of an optical fiber employed as a nonlinear optical fiber in an optical device are concerned, it is preferred that the transmission loss be 5.0 dB/km or less in characteristics with respect to light having a wavelength of 1.00 µm. More preferably, the transmission loss is 3.0 dB/km or less.

When the transmission loss on the shorter wavelength side is lowered as such, it is possible to yield an optical fiber having favorable characteristics suitable when employed as a nonlinear optical fiber in the optical device, e.g., the transmission loss at an excitation light wavelength in Raman amplification is reduced therein.

When $SiO_2$ glass doped with a high concentration of $GeO_2$ is synthesized by MCVD method so as to prepare an optical fiber having a large relative refractive index difference Δn, for example, the transmission loss deteriorates since there are many glass defects. Such a tendency becomes remarkable on the shorter wavelength side in particular. By contrast, the above-mentioned configuration and manufacturing method of the optical fiber can yield an optical fiber in which the transmission loss on the shorter wavelength side is fully reduced. Also, since the Rayleigh scattering coefficient decreases in such an optical fiber, the signal noise occurring upon Raman amplification due to double Rayleigh scattering can be suppressed.

Taking account of the foregoing conditions, an optical fiber having the double-cladding structure shown in FIG. 1 was prepared. Its configuration was such that the outer diameter $2r_1$=4.6 µm and the relative refractive index difference $\Delta^+$=3.2% in the core region 10, the outer diameter $2r_2$=13.1 µm and the relative refractive index difference $\Delta^-$=–0.50% in the first cladding region 20, and the outer diameter (the outer diameter of the glass portion of the optical fiber) $2r_3$=110 µm in the second cladding region 30. Here, the F doping concentration in the second cladding region 30 was 0.6 mol %. The coating portion covering the optical fiber from the outer periphery thereof had an outer diameter of 150 µm.

With respect to light having a wavelength of 1.5 µm, the optical fiber exhibited characteristics of:
 dispersion=–0.64 ps/km/nm;
 dispersion slope=+0.042 ps/km/nm$^2$;
 effective area $A_{eff}$=10.0 µm$^2$;
 cutoff wavelength $\lambda_c$=1396 nm;
 zero-dispersion wavelength $\lambda_c$=1565 nm;
 transmission loss=0.70 dB/km;
 nonlinear coefficient γ=22.2/W/km; and
 polarization mode dispersion PMD=0.05 ps/$\sqrt{km}$;
whereby an optical fiber (nonlinear optical fiber) having favorable characteristics was obtained.

Figure 17:
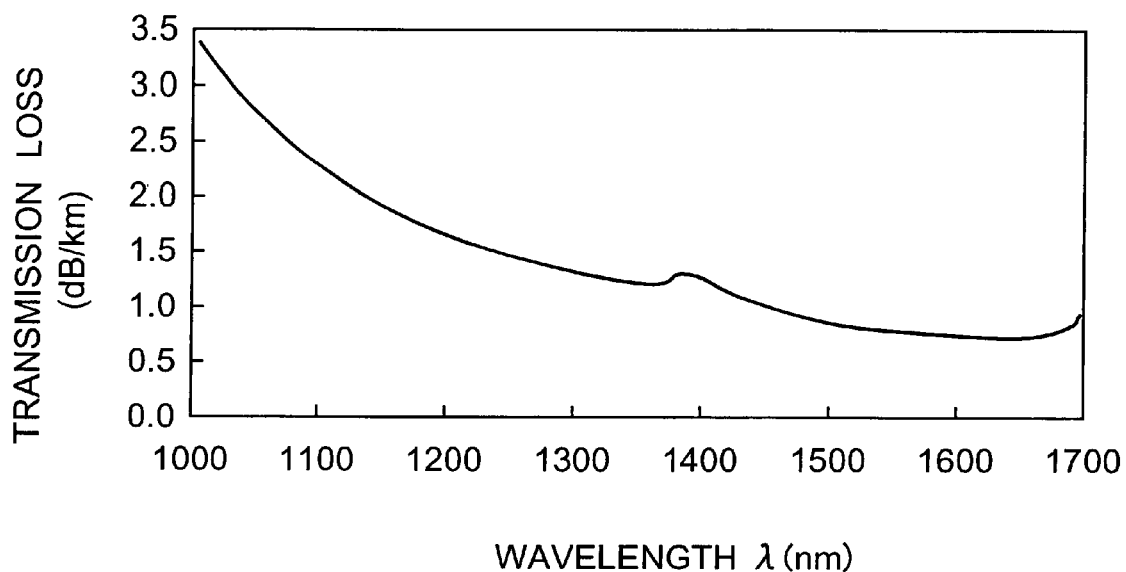
FIG. 17 is a graph showing the dependence of the transmission loss of an optical fiber upon wavelength.

The optical fiber of this example was wound on a bobbin having a diameter of 60 mm by a fiber length of 1.0 km, so as to form a coil, and a module was made. FIG. 17 shows the dependence of the transmission loss upon wavelength in such an optical fiber. In the graph of FIG. 17, the abscissa indicates the wavelength λ (nm) of light transmitted through the optical fiber, whereas the ordinate indicates the transmission loss (dB/km) at each wavelength.

As can be seen from this graph, a favorable optical module whose transmission loss does not deteriorate even in a longer-wavelength region can be prepared when this optical fiber is used. Such an optical fiber can be used, for example, in a wavelength converter module to which excitation light at a wavelength around 1565 nm is supplied, so as to convert signal light whose wavelength band lies in C band into L band or vice versa. Also, it can be used in a Raman amplifier module which optically amplifies signal light when excitation light having a wavelength shorter than that of the signal light is supplied thereto.

While this optical fiber was prepared according to the method of making an optical fiber mentioned above in connection with FIG. 1, its transmission loss with respect to light having a wavelength of 1.00 µm was 3.4 dB/km. This is a low value satisfying the condition of 5.0 dB/km or less. The optical fiber having a low transmission loss on the shorter wavelength side as such reduces the transmission loss at an excitation wavelength for Raman amplification located on the shorter wavelength side than the signal light. Also, since the Rayleigh scattering coefficient decreases in such an optical fiber, noise can be restrained from occurring due to double Rayleigh scattering.

As another optical fiber, an optical fiber having the double-cladding structure shown in FIG. 1 was prepared. Its configuration was such that the outer diameter $2r_1$=2.5 µm and the relative refractive index difference $\Delta^+$=2.9% in the core region 10, the outer diameter $2r_2$10.0 µm and the relative refractive index difference $\Delta^-$=–0.50% in the first cladding region 20, and the outer diameter (the outer diameter of the glass portion of the optical fiber) $2r_3$=89 µm in the second cladding region 30. Here, the F doping concentration in the second cladding region 30 was 0.6 mol %. The outer diameter of the coating portion covering the optical fiber from the outer periphery was 115 µm.

With respect to light having a wavelength of 1.5 µm, this optical fiber exhibited characteristics of:
 dispersion=–110.6 ps/km/nm;
 dispersion slope=–0.408 ps/km/nm$^2$;
 effective area $A_{eff}$=10.6 µm$^2$;
 cutoff wavelength $\lambda_c$=729 nm;
 transmission loss=0.52 dB/km;
 nonlinear coefficient γ=20.0/W/km; and
 polarization mode dispersion PMD=0.03 ps/$\sqrt{km}$;
whereby an optical fiber (nonlinear optical fiber) having favorable characteristics was obtained.

This optical fiber has a negative dispersion and a negative dispersion slope. As a consequence, this optical fiber is a highly nonlinear optical fiber which, in the 1.55-µm band, can compensate for both of the dispersion and dispersion slope of a single-mode optical fiber having a zero-dispersion wavelength in the 1.3-µm band.

The glass portion in this optical fiber has a small outer diameter of 89 µm, satisfying the condition of not greater than 100 µm, and further the condition of not greater than 90 µm. Also, the coating portion has a small outer diameter of 115 µm, satisfying the condition of not greater than 150 µm, and further the condition of not greater than 120 µm. As a consequence, it is an optical fiber having favorable bending characteristics when formed into a coil.

Figure 18:
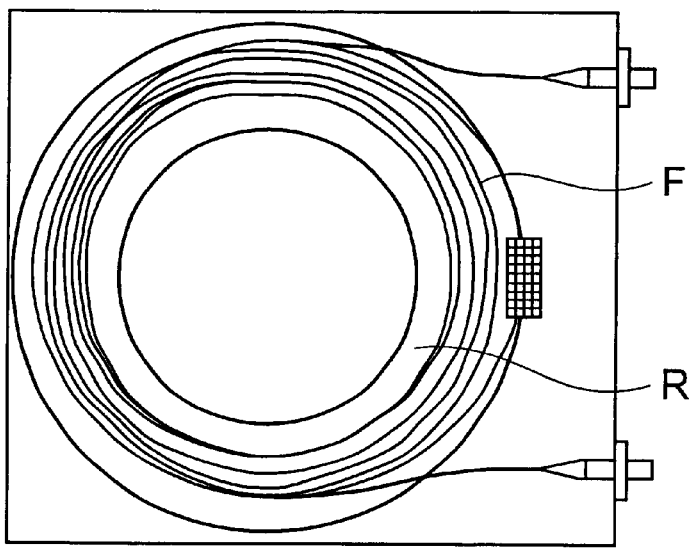
FIG. 18 is a view schematically showing the configuration of an optical fiber coil.

The optical fiber in accordance with this example was formed into a coil by a fiber length of 7.7 km, so as to be modularized. Here, when forming a coil, the optical fiber was not wound on a bobbin. Employed here was a configuration in which, as FIG. 18 shows the configuration of an optical fiber coil, the optical fiber F was formed into a coil without being wound on a bobbin, and the resulting coil-shaped fiber bundle was covered with a coating resin R.

In such a configuration, no winding tension occurs since it has no bobbin for winding the optical fiber, whereas there is no problem of distortion caused by the tare weight of the optical fiber since the fiber bundle as a whole is covered with a resin. As a consequence, the deterioration in transmission loss caused by microbend can greatly be suppressed.

Figure 19:
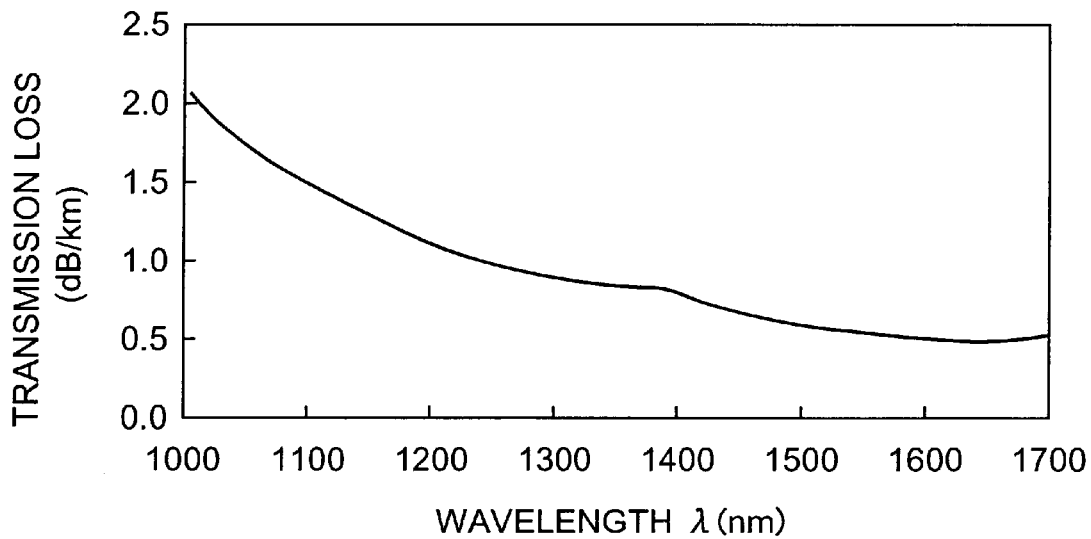
FIG. 19 is a graph showing the dependence of the transmission loss of an optical fiber upon wavelength.

FIG. 19 shows the dependence of the transmission loss upon wavelength in such an optical fiber. In FIG. 19, the abscissa indicates the wavelength λ (nm) of light transmitted through the optical fiber, whereas the ordinate indicates the transmission loss (dB/km) at each wavelength.

As can be seen from this graph, a favorable optical module whose transmission loss does not deteriorate in the longer wavelength region can be prepared when the above-mentioned optical fiber and configuration of optical fiber coil are used. The optical fiber exhibited such a favorable temperature characteristic that the fluctuation in transmission loss is ±0.01 dB/km or less within the temperature range of −40° C. to +80° C. with respect to light having a wavelength of 1620 nm which is the most susceptible to the temperature fluctuation. On the other hand, in the usual configuration of winding the optical fiber on a bobbin, the winding tension within the optical fiber changes because of the thermal expansion of the bobbin, and thus the deterioration of the temperature characteristic tends to occur in the longer wavelength region.

While this optical fiber was prepared according to the method of making an optical fiber mentioned above in connection with FIG. 1, its transmission loss with respect to light having a wavelength of 1.00 μm was 2.1 dB/km. This is a low value satisfying the condition of 5.0 dB/km or less, and further the condition of 3.0 dB/km or less. The optical fiber having a low transmission loss on the shorter wavelength side as such reduces the transmission loss at an excitation wavelength for Raman amplification located on the shorter wavelength side than the signal light. Also, since the Rayleigh scattering coefficient decreases in such an optical fiber, noise can be restrained from occurring due to double Rayleigh scattering.

Also, this optical fiber can compensate in the 1.55-μm band for both of the dispersion and dispersion slope of the fiber length 50 km of a single-mode optical fiber having a zero-dispersion wavelength in the 1.3-μm band.

As another optical fiber, an optical fiber having the double-cladding structure shown in FIG. 1 was prepared. Its configuration was such that the outer diameter $2r_1=2.2$ μm and the relative refractive index difference $\Delta^+=3.2\%$ in the core region 10, whereas the outer diameter $2r_2=8.8$ μm and the relative refractive index difference $\Delta^-=-0.60\%$ in the first cladding region 20. Here, the F doping concentration in the second cladding region 30 was 0.6 mol %.

With respect to light having a wavelength of 1.55 μm, this optical fiber exhibited characteristics of:

dispersion=−205.7 ps/km/nm;

dispersion slope=−21.35 ps/km/nm$^2$;

effective area $A_{eff}$=10.1 μm$^2$;

cutoff wavelength $\lambda_c$=707 nm;

transmission loss=0.51 dB/km;

nonlinear coefficient γ=21.7/W/km; and polarization mode dispersion PMD=0.01 ps/√km;

whereby an optical fiber (nonlinear optical fiber) having favorable characteristics was obtained.

With respect to light having a wavelength of 1.50 μm, this optical fiber exhibited characteristics of:

dispersion=−147.4 ps/km/nm;

dispersion slope=−0.696 ps/km/nm$^2$;

effective area $A_{eff}$=8.6 μm$^2$;

transmission loss=0.58 dB/km;

nonlinear coefficient γ=24.0/W/km; and polarization mode dispersion PMD=0.01 ps/√km.

This optical fiber has a negative dispersion and a negative dispersion slope. As a consequence, this optical fiber is a highly nonlinear optical fiber which, in the 1.50-μm band, can compensate for both of the dispersion and dispersion slope of a single-mode optical fiber having a zero-dispersion wavelength in the 1.3-μm band. Therefore, for example, it can be used as a Raman amplification optical fiber by supplying thereto excitation light having a wavelength in the 1.40-μm band.

Explained in the following are a Raman amplifier (optical amplifier) and a wavelength converter as examples of optical devices (or optical modules in which these devices are modularized) which can employ the optical fiber having the above-mentioned configuration and characteristics as a nonlinear optical fiber.

Figure 20:
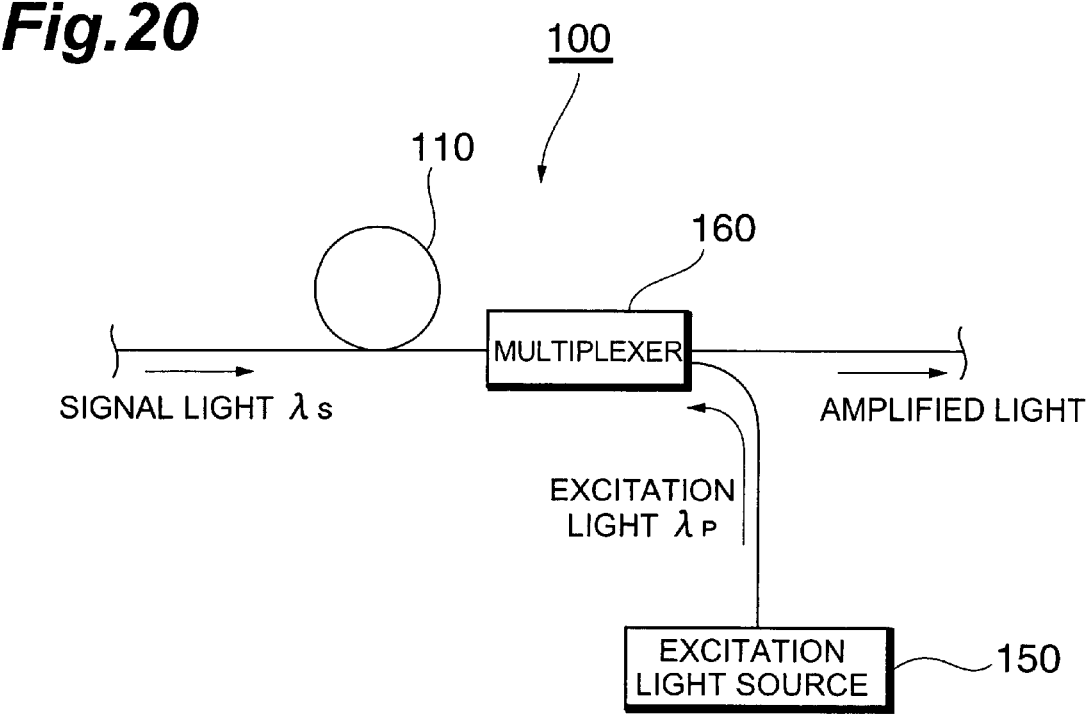
FIG. 20 is a diagram showing an embodiment of Raman amplifier.

FIG. 20 is a diagram showing an embodiment of the Raman amplifier in accordance with the present invention. This Raman amplifier 100 optically amplifies inputted signal light having a wavelength $\lambda_s$; and comprises a Raman amplification optical fiber 110 (having a cutoff wavelength $\lambda_c$) in which the above-mentioned optical fiber is employed as a nonlinear optical fiber, and an excitation light source 150 for supplying excitation light having a predetermined wavelength $\lambda_p$ to the Raman amplification optical fiber 110.

Byway of an optical multiplexer 160 located downstream the Raman amplification optical fiber 110, the excitation light source 150 is connected to an optical transmission line in the Raman amplifier 100. Thus, the Raman amplifier 100 is configured as a counter-propagating pumping (backward pumping) optical amplifier. Therefore, the inputted signal light is optically amplified by use of the stimulated Raman effect, which is a nonlinear optical phenomenon exhibited in the Raman amplification optical fiber 110, and is outputted as amplified light.

Unlike optical amplifiers such as EDFA, such a Raman amplifier is not selective about wavelength bands to be amplified, and has a wide amplification wavelength band of about 100 nm when it is an SiO$_2$ type optical fiber, thereby being suitable for optical amplification in WDM transmissions having a wide bandwidth. Employed as the wavelength $\lambda_p$ of excitation light is a wavelength shorter than the wavelength $\lambda_s$ of signal light. For example, when signal light in the 1.55-μm wavelength band is to be optically amplified, excitation light having a wavelength of about 1.45 μm is used.

When WDM signals are to be optically amplified in a collective manner by the Raman amplification optical fiber 110 employed in the Raman amplifier 100, it is preferred that the dispersion value with respect to signal light having the wavelength $\lambda_s$ be at least +2 ps/km/nm or not exceeding −2 ps/km/nm so that no four-wave mixing occurs. For example, the optical fibers E1 and E2 in FIG. 14 are preferable with respect to signal light in the 1.55-μm wavelength band.

When the dispersion value is positive, it is necessary for the core region 10 to enhance the outer diameter $2r_1$, whereby the cutoff wavelength $\lambda_c$ becomes relatively long. By contrast, the above-mentioned optical fiber having the double-cladding structure can make the cutoff wavelength $\lambda_c$ shorter than the excitation light wavelength $\lambda_p$ of about 1.45 μm ($\lambda_c<\lambda_p$). When $\lambda_c<\lambda_p$, light can be amplified with a high efficiency in a single mode.

Figure 21:
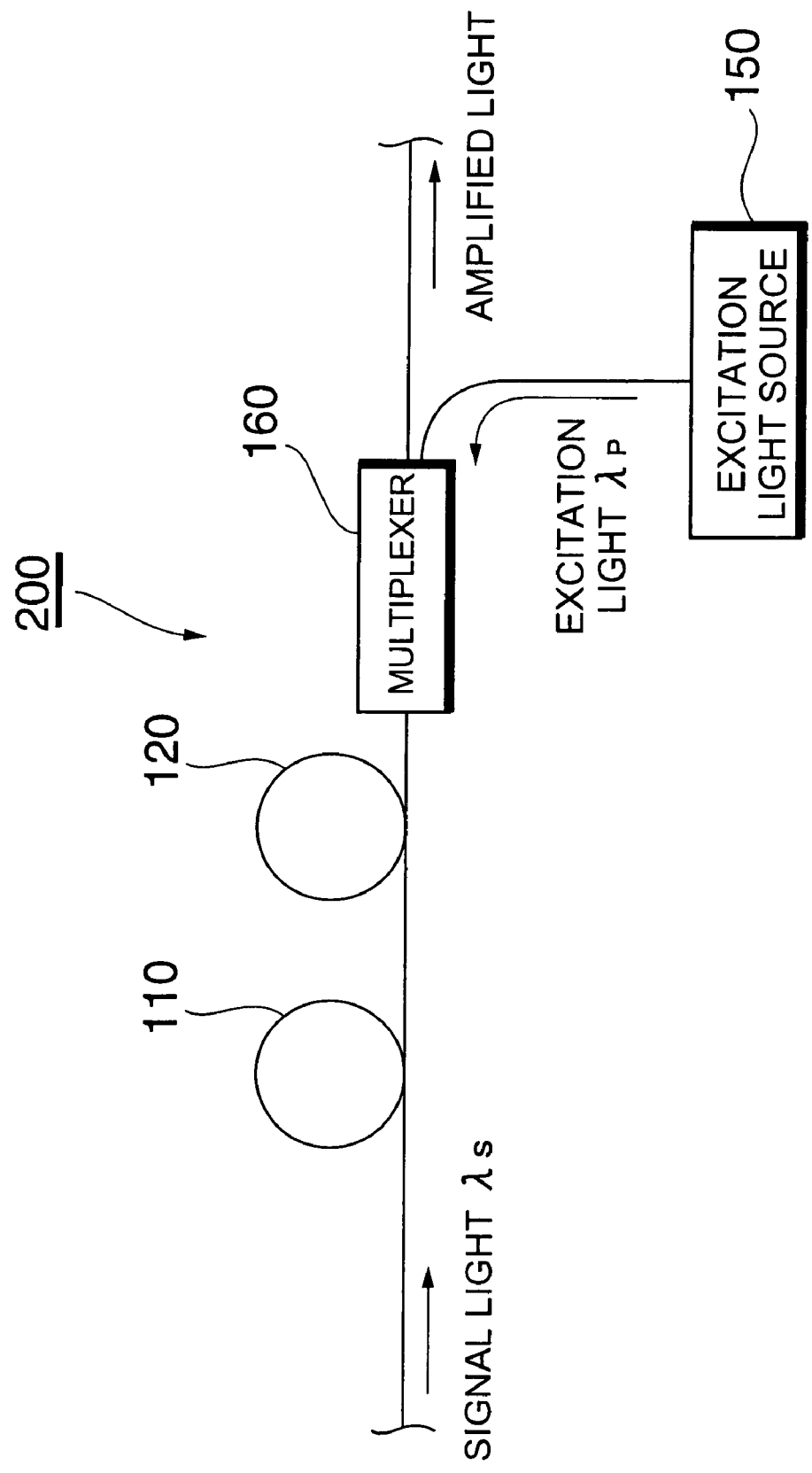
FIG. 21 is a diagram showing another embodiment of Raman amplifier.

When nonlinear optical fibers having positive and negative dispersion values, respectively, are combined together, a Raman amplifier having a zero dispersion as a whole can be constructed. FIG. 21 shows a configurational example of such a Raman amplifier.

The Raman amplifier 200 has a configuration similar to that of the Raman amplifier 100 shown in FIG. 20, but differs therefrom in that the Raman amplification optical fiber 110 is a nonlinear optical fiber having a negative dispersion value (e.g., −2 ps/km/nm or less), and that a Raman amplification optical fiber 120 having a positive dispersion value (e.g., +2 ps/km/nm or greater) is serially connected between the Raman amplification optical fiber 110 and the optical multiplexer 160. Such a configuration can cause the dispersion of the outputted amplified light to become substantially zero.

Though EDFA cannot optically amplify the signal light in the wavelength band of 1.45 to 1.53 µm known as S band, the Raman amplifier nonselective about the wavelength band to be excited can optically amplify signal light whose wavelength $\lambda_s$ is at least 1.45 µm but not longer than 1.53 µm. Also, as mentioned above, the double-cladding structure can shorten the cutoff wavelength $\lambda_c$ as exemplified by the optical fiber E5 in FIG. 14, thereby being favorably applicable to optical amplification of signal light in the S band. The dispersion value of the optical fiber E5 at a wavelength of 1.40 µm is −6.1 ps/km/nm, thus being in a preferable range.

In the case where the dispersion value of the optical transmission line is positive within the signal wavelength band in use, the Raman amplifier can be used as both of an optical amplifier and a dispersion compensator for the optical transmission line having a positive dispersion value, if the dispersion value of the Raman amplification optical fiber used in the Raman amplifier is set negative. Here, if the dispersion value with respect to signal light having the wavelength $\lambda_s$ is −10 ps/km/nm or less, the amount of dispersion compensation will be so large that the Raman amplifier can favorably be utilized in particular as a dispersion compensator as well. Also, it is preferred that the effective area $A_{eff}$ be 10 µm² or less.

Further, as exemplified by the optical fibers E3 and E4 in FIG. 14 and the optical fiber F1 in FIG. 16, the nonlinear optical fiber having the double-cladding structure can cause the dispersion slope to have a negative value (a value smaller than 0 ps/km/nm²) at the wavelength of signal light. In this case, not only the dispersion but also the dispersion slope of the transmission line having a positive dispersion and a positive dispersion slope can be compensated for. Therefore, it is favorable in WDM transmissions.

Here, for realizing Raman amplification at a high efficiency, it is preferred that nonlinearity be higher at the wavelength $\lambda_p$ of excitation light in the nonlinear optical fiber used in a Raman amplifier. For preventing the transmission quality from deteriorating due to nonlinear effects, it is preferred that the nonlinearity at the wavelength $\lambda_s$ of the signal light be lower.

For realizing such characteristic conditions concerning the nonlinearity in the nonlinear optical fiber employed in an optical amplifier, it is preferred that the effective area $A_{eff,p}$ at the wavelength $\lambda_p$ of excitation light and the effective area $A_{eff,s}$ at the wavelength $\lambda_p+0.1$ µm satisfy the relational expression of $$(A_{eff,s}-A_{eff,p})/A_{eff,p} \times 100 \geq 10\%,$$

whereby the effective area $A_{eff,s}$ is greater than the effective area $A_{eff,p}$ by at least 10%.

The wavelength $\lambda_p+0.1$ µm obtained when 0.1 µm is added to the wavelength $\lambda_p$ of excitation light corresponds to the wavelength $\lambda_s$ of signal light optically amplified in the Raman amplifier. Therefore, according to the characteristic conditions satisfying the above-mentioned relational expression, the effective area $A_{eff,p}$ can be reduced, so as to increase the nonlinearity with respect to excitation light at the wavelength $\lambda_p$, thereby improving the efficiency in optical amplification. Also, the effective area $A_{eff,s}$ can be enhanced, so as to lower the nonlinearity with respect to signal light at the wavelength $\lambda_p+0.1$ µm, thereby suppressing the deterioration in transmission quality of signal light.

For example, the phase shift amount caused by self-phase modulation is proportional to the reciprocal of the effective area. Therefore, if the effective area $A_{eff,s}$ at the wavelength $\lambda_s$ of signal light, which is around $\lambda_p+0.1$ µm, is greater than the effective area $A_{eff,p}$ at the wavelength $\lambda_p$ of excitation light by 10%, the phase shift amount will be smaller by 10%.

While taking account of the characteristic conditions of effective area $A_{eff}$, an optical fiber having the double-cladding structure shown in FIG. 1 was prepared. Its configuration was such that the outer diameter $2r_1=3.1$ µm and the relative refractive index difference $\Delta^+=3.4\%$ in the core region 10, whereas the outer diameter $2r_2=8.8$ µm and the relative refractive index difference $\Delta^-=-0.15\%$ in the first cladding region 20. Here, the F doping concentration in the second cladding region 30 was 1.1 mol %.

With respect to light having a wavelength of 1.55 µm, this optical fiber exhibited characteristics of:

dispersion=−49.0 ps/km/nm;

dispersion slope=+0.005 ps/km/nm²;

effective area $A_{eff}=8.4$ µm²;

cutoff wavelength $\lambda_c=1060$ nm;

transmission loss=0.54 dB/km;

nonlinear coefficient γ=23.4/W/km; and polarization mode dispersion PMD=0.02 ps/√+e,fra km+ee .

Figure 22:
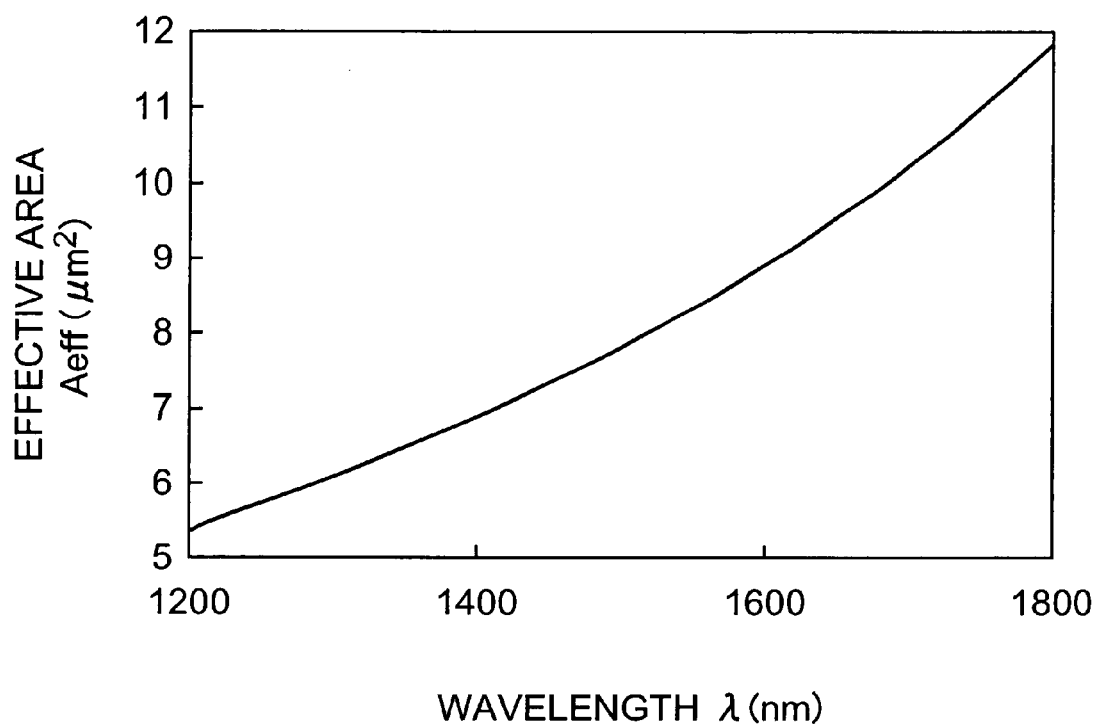
FIG. 22 is a graph showing the dependence of the effective area of an optical fiber upon wavelength.

FIG. 22 shows the dependence of effective area $A_{eff}$ upon wavelength in the optical fiber of this example. In the graph of FIG. 22, the abscissa indicates the wavelength λ (nm) of light transmitted through the optical fiber, whereas the ordinate indicates the effective area $A_{eff}$ (µm²) at each wavelength. In this optical fiber, as shown in the graph, the effective area $A_{eff}$ increases as the wavelength λ becomes longer.

For example, when excitation light whose wavelength $\lambda_p=1.40$ µm is used with respect to signal light whose wavelength $\lambda_s=1.50$ µm, the effective area is:

$A_{eff,s}=7.85$ µm² for the signal light; and $A_{eff,p}=6.93$ µm² for the excitation light.

Here, the difference between the respective effective areas at the wavelengths $\lambda_s$ and $\lambda_p$ is $$(A_{eff,s}-A_{eff,p})/A_{eff,p} \times 100=13.3\%.$$

When excitation light whose wavelength $\lambda_p=1.45$ µm is used with respect to signal light whose wavelength $\lambda_s=1.55$ µm, the effective area is:

$A_{eff,s}=8.37$ µm² for the signal light; and $A_{eff,p}=7.37$ µm² for the excitation light.

Here, the difference between the respective effective areas at the wavelengths $\lambda_s$ and $\lambda_p$ is $$(A_{eff,s}-A_{eff,p})/A_{eff,p} \times 100=13.6\%.$$

When excitation light whose wavelength $\lambda_p-1.50$ µm is used with respect to signal light whose wavelength $\lambda_{s=}1.60$ µm, the effective area is:

$A_{eff,s}=8.93$ µm² for the signal light; and $A_{eff,p}=7.85$ µm² for the excitation light.

Here, the difference between the respective effective areas at the wavelengths $\lambda_s$ and $\lambda_p$ is $$(A_{eff,s}-A_{eff,p})/A_{eff,p} \times 100=13.8\%.$$

In this optical fiber, as in the foregoing, a favorable characteristic condition of $(A_{eff,s} - A_{eff,p})/A_{eff,p} \times 100 = 10\%.$ is satisfied for any signal light whose wavelength $\lambda_s = 1.50$ μm, 1.5 μm, or 1.60 μm. This makes it possible to realize a nonlinear optical fiber and Raman amplifier which can improve the efficiency in optical amplification with respect to light within the wavelength range including these wavelengths and suppress the deterioration in transmission quality of signal light.

Figure 23:
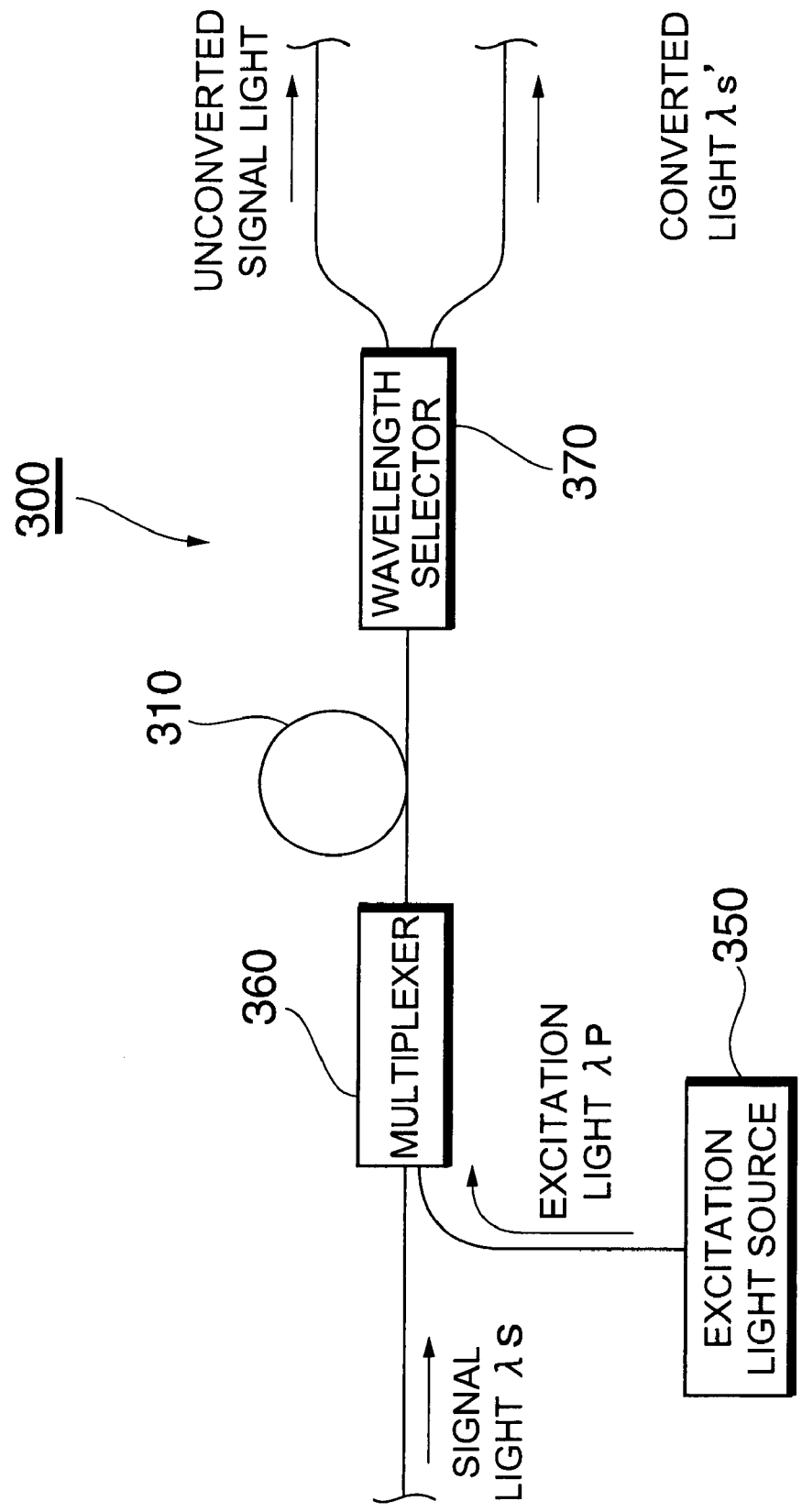
FIG. 23 is a diagram showing an embodiment of wavelength converter.

FIG. 23 is a diagram showing an embodiment of the wavelength converter in accordance with the present invention. The wavelength converter 300 is used for wavelength conversion of inputted signal light having a wavelength $\lambda_s$; and comprises a wavelength-converting optical fiber 310 (having a cut off wavelength $\lambda_c$) employing the above-mentioned optical fiber as a nonlinear optical fiber, and an excitation light source 350 for supplying the excitation light having a predetermined wavelength $\lambda_p$ to the wavelength-converting optical fiber 310.

Figure 24A:
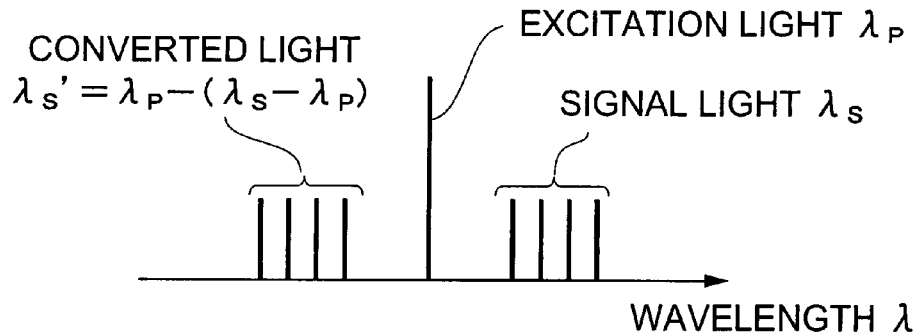
FIGS. 24A to 24C are views schematically showing the wavelength conversion carried out by the wavelength converter shown in FIG. 23.

By way of an optical multiplexer 360 disposed upstream the wavelength-converting optical fiber 310, the excitation light source 350 is connected to an optical transmission line within the wavelength converter 300. As a consequence, the inputted signal light having a wavelength $\lambda_s$ is wavelength-converted by utilizing four-wave mixing, which is a non-linear optical phenomenon exhibited in the wavelength-converting optical fiber 310, and is outputted as converted light having the following wavelength $\lambda_s'$:

$$\lambda_s' = \lambda_p - (\lambda_s - \lambda_p)$$

by way of a wavelength selector 370 (see FIG. 24A).

Here, as for the signal light inputted to the wavelength converter 300, a plurality of signal light components having wavelengths different from each other can be inputted simultaneously. In this case, a plurality of converted light components each having a wavelength corresponding to the wavelength of the respective signal light component are obtained on the inputted signal light components.

Such a wavelength converter can separately or collectively wavelength-convert WDM signals having a high transmission speed per channel. As exemplified by the optical fibers E6 and E8 in FIG. 14 and the optical fiber F3 in FIG. 16, nonlinear optical fibers having a double-cladding structure can fully enhance the nonlinear coefficient γ, so as to carry out wavelength conversion with a high efficiency, while keeping the cutoff wavelength $\lambda_c$ short. In particular, wavelength conversion can be carried out with a high efficiency in a single mode if the cutoff wavelength $\lambda_c$ is made shorter than each of the respective wavelengths $\lambda_s$, $\lambda_s'$, and $\lambda_p$ of signal light, converted light, and excitation light ($\lambda_c < \lambda_s, \lambda_s', \lambda_p$).

Since four-wave mixing is likely to occur when the respective phases of signal light, excitation light, and converted light match with each other, the dispersion value with respect to excitation light having a wavelength $\lambda_p$ is preferably within the range of at least −0.2 ps/km/nm but not greater than +0.2 ps/km/nm and, more preferably, the excitation light wavelength $\lambda_p$ substantially coincides with the zero-dispersion wavelength in particular. When the power of excitation light is raised, the optical power of converted light to be outputted can be made greater than that of inputted signal light. In this case, the wavelength converter can also be utilized as a parametric amplifier.

In the wavelength conversion from C band to S band, it is desirable that the zero-dispersion wavelength be near 1.53 μm and that the cutoff wavelength $\lambda_c$ be shorter than the wavelength $\lambda_s'$ of the converted light. Such characteristic conditions can be realized by nonlinear optical fibers having a double-cladding structure as exemplified by the optical fiber E7 in FIG. 14.

Figure 24B:
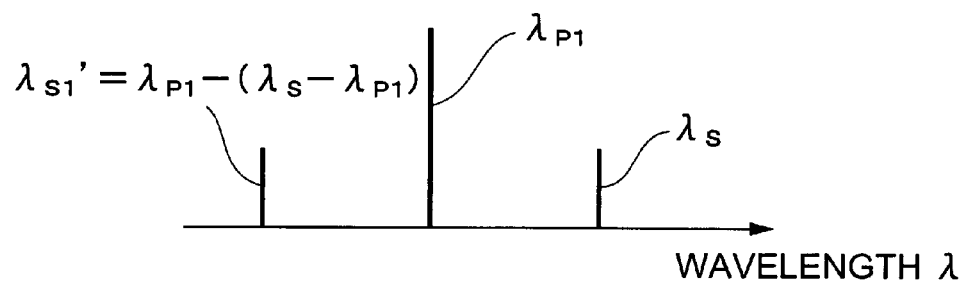
Figure 24C:
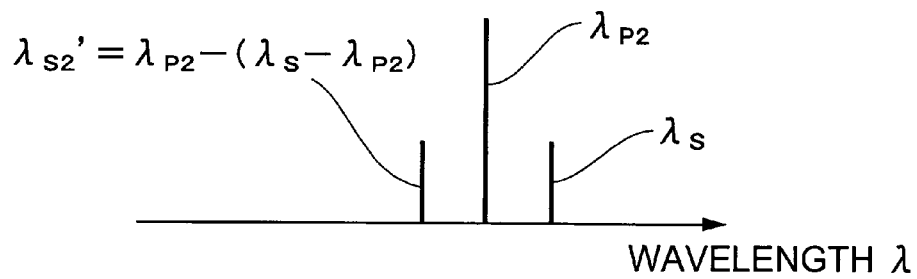

When the excitation light source 350 is a wavelength-variable light source, so that the wavelength $\lambda_p$ of excitation light is changed, any wavelength conversion is possible. In the example of FIG. 24B, for instance, the excitation light wavelength is $\lambda_{p1}$ with respect to signal light having a wavelength $\lambda_s$, whereby converted light having a wavelength $\lambda_{s1}'$:

$$\lambda_{s1}' = \lambda_{p1} - (\lambda_s - \lambda_{p1})$$

is obtained. When the excitation light wavelength is changed to $\lambda_{p2}$ as shown in FIG. 24C, converted light having a wavelength $\lambda_{s2}'$:

$$\lambda_{s2}' = \lambda_{p2} - (\lambda_s - \lambda_{p2})$$

which differs from the wavelength $\lambda_{s1}'$ can be obtained. For matching phases, the dispersion value with respect to the excitation light wavelength is preferably within the range of at least −0.2 ps/km/nm but not greater than +0.2 ps/km/nm in this case as well.

When carrying out Raman amplification of C band, the excitation light has a wavelength near 1.45 μm. When carrying out Raman amplification of S band, the excitation light has a wavelength of 1.3 to 1.4 μm, whereas the signal light has a wavelength of 1.45 to 1.53 μm. When carrying out wavelength conversion to S band or wavelength conversion from S band to C or L band, signal light or converted light has a wavelength ranging of 1.45 to 1.53 μm. These cases are susceptible to the absorption loss at a wavelength of 1.38 μm caused by OH group. By contrast, the optical fibers E1 to E8 in FIG. 14 and the optical fibers F1 to F3 in FIG. 16 can favorably be used in such cases as well since the increase in transmission loss (excess absorption loss) caused by OH group absorption at a wavelength of 1.38 μm is 0.2 dB/km or less in each of them as mentioned above.

As explained in detail in the foregoing, the optical fiber and nonlinear optical fiber, the optical amplifier and wavelength converter using the same, and the method of making an optical fiber in accordance with the present invention yield the following effects. Namely, the optical fiber and nonlinear optical fiber having the configuration mentioned above not using a single-cladding structure but a double-cladding structure can fully shorten the cutoff wavelength $\lambda_c$ even when, in order to increase the nonlinear coefficient γ, the concentration of $GeO_2$ added into the core is enhanced so as to raise the nonlinear refractive index and the relative refractive index difference between the core and cladding is made greater so as to reduce the effective area $A_{eff}$. Also, this configuration can make the dispersion slope negative. Further, a polarization-maintaining fiber having a high non-linearity and a highly nonlinear optical fiber having a low transmission loss while exhibiting a small polarization mode dispersion are obtained. When the glass portion or coating portion of the optical fiber has a small diameter, an optical fiber suitable for modularization in optical devices can be obtained.

The above-mentioned method of making the optical fiber in which a core glass rod and a first cladding glass pipe are integrated upon heating under a predetermined condition can make an optical fiber of a double-cladding structure having a high nonlinearity with favorable characteristics such as low transmission loss. Such an optical fiber can be employed as a nonlinear optical fiber exhibiting a high nonlinearity while having favorable characteristics concerning cutoff wavelength $\lambda_c$ and the like in optical devices utilizing nonlinear optical phenomena, such as optical amplifiers and wavelength converters. In particular, it can carry out optical amplification and wavelength conversion with a high efficiency in a single mode, since the cutoff wavelength $\lambda_c$ becomes a short wavelength.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising, at least, a core region having a maximum refractive index value of $n_1$; a first cladding region, disposed at an outer periphery of said core region, having a minimum refractive index value of $n_2$ (where $n_2 < n_1$); and a second cladding region, disposed at an outer periphery of said first cladding region, having a maximum refractive index value of $n_3$ (where $n_2 < n_3 < n_1$); and having, as characteristics with respect to light having a wavelength of 1.55 μm, an effective area of 11 μm² or less, a cutoff wavelength $\lambda_c$ of at least 0.7 μm but not exceeding 1.6 μm at a fiber length of 2 m, and a nonlinear coefficient of at least 18/W/km.

2. An optical fiber according to claim 1, further having, as characteristics with respect to light having a wavelength of 1.55 μm, a transmission loss of 3.0 dB/km or less, and a crosstalk of −15 dB or less between polarized waves.

3. An optical fiber according to claim 1, further having, as characteristics with respect to light having a wavelength of 1.55 μm, a transmission loss of 1.0 dB/km or less, and a polarization mode dispersion of 0.3 ps/√km or less.

4. An optical fiber according to claim 1, wherein said core region and said second cladding region have therebetween are relative refractive index difference $\Delta^+$ which is at least 2.7% with reference to said second cladding region.

5. An optical fiber according to claim 1, further comprising a hermetic coat disposed on an outer periphery of said second cladding region.

6. An optical fiber according to claim 1, wherein excess absorption loss caused by OH group with respect to light having a wavelength of 1.38 μm is 0.2 dB/km or less.

7. An optical fiber according to claim 1, wherein said second cladding region is doped with fluorine.

8. An optical fiber according to claim 1, wherein a glass portion including said core region, first cladding region, and second cladding region has an outer diameter of 100 μm or less.

9. An optical fiber according to claim 8, wherein said glass portion has an outer diameter of 90 μm or less.

10. An optical fiber according to claim 1, wherein a coating portion disposed at an outer periphery of a glass portion including said core region, first cladding region, and second cladding region has an outer diameter of 150 μm or less.

11. An optical fiber according to claim 10, wherein said coating portion has an outer diameter of 120 μm or less.

12. An optical fiber according to claim 1, having a transmission loss of 5.0 dB/km or less as a characteristic with respect to light having a wavelength of 1.00 μm.

13. An optical fiber according to claim 12, wherein said transmission loss is 3.0 dB/km or less as a characteristic with respect to light having a wavelength of 1.00 μm.

14. A nonlinear optical fiber which is the optical fiber according to claim 1 utilizing a nonlinear optical phenomenon exhibited when light having a predetermined wavelength is fed therein.

15. An optical amplifier comprising:

the nonlinear optical fiber according to claim 14 having a cutoff wavelength $\lambda_c$; and an excitation light source for supplying excitation light having a predetermined wavelength $\lambda_p$ (where $\lambda_c < \lambda_p$) to said nonlinear optical fiber with respect to signal light having a wavelength $\lambda_s$ fed into said nonlinear optical fiber;

wherein a nonlinear optical phenomenon exhibited in said nonlinear optical fiber is utilized for optically amplifying said signal light.

16. An optical amplifier according to claim 15, wherein said nonlinear optical fiber has a dispersion value of at least +2 ps/km/nm or not greater than −2 ps/km/nm with respect to said signal light having a wavelength $\lambda_s$.

17. An optical amplifier according to claim 15, wherein said nonlinear optical fiber has a dispersion value of −10 ps/km/nm or less with respect to said signal light having a wavelength $\lambda_s$, and an effective area of 10 μm² or less.

18. An optical amplifier according to claim 17, wherein said nonlinear optical fiber has a dispersion slope value smaller than 0 ps/km/nm² with respect to said signal light.

19. An optical amplifier according to claim 15, wherein said signal light has a wavelength $\lambda_s$ of at least 1.45 μm but not exceeding 1.53 μm.

20. An optical amplifier according to claim 15, satisfying the relational expression for said nonlinear optical fiber of:

$$(A_{eff,s} - A_{eff,p})/A_{eff,p} \times 100 \geq 10\%$$

where $A_{eff,p}$ is the effective area at said wavelength $\lambda_p$ of said excitation light, and $A_{eff,s}$ is the effective area at a wavelength $\lambda_p + 0.1$ μm.

21. A wavelength converter comprising:

the nonlinear optical fiber according to claim 14 having a cutoff wavelength $\lambda_c$; and an excitation light source for supplying excitation light having a predetermined wavelength $\lambda_p$ (where $\lambda_c < \lambda_p$) to said nonlinear optical fiber with respect to signal light having a wavelength $\lambda_s$ (where $\lambda_c < \lambda_s$) fed into said nonlinear optical fiber;

wherein a nonlinear optical phenomenon exhibited in said nonlinear optical fiber is utilized for converting the wavelength of said signal light so as to output converted light having a wavelength $\lambda_s'$ (where $\lambda_c < \lambda_s'$).

22. A wavelength converter according to claim 21, wherein said converted light to be outputted has an optical power higher than that of said signal light inputted.

23. A wavelength converter according to claim 21, wherein said nonlinear optical fiber has a dispersion value of at least −0.2 ps/km/nm but not exceeding +0.2 ps/km/nm with respect to said excitation light having a wavelength $\lambda_p$.

24. A wavelength converter according to claim 21, wherein said converted light has a wavelength $\lambda_s'$ of at least 1.45 μm but not exceeding 1.53 μm.

* * * * *

UNITED STATES PATENT AND TRADEMARK OFFICE
CERTIFICATE OF CORRECTION

PATENT NO. : 6,661,958 B2  
DATED : December 9, 2003  
INVENTOR(S) : Masaaki Hirano et al.

It is certified that error appears in the above-identified patent and that said Letters Patent is hereby corrected as shown below:

<u>Column 29,</u>  
Line 41, change "are" to -- a --

Signed and Sealed this

Thirty-first Day of August, 2004

JON W. DUDAS  
*Director of the United States Patent and Trademark Office*